(12) United States Patent
Cruz et al.

(10) Patent No.: US 11,505,630 B2
(45) Date of Patent: Nov. 22, 2022

(54) PEROXIDE TREATED BLOW MOLDING POLYMERS WITH INCREASED WEIGHT SWELL AND CONSTANT DIE SWELL

(71) Applicant: Chevron Phillips Chemical Company LP, The Woodlands, TX (US)

(72) Inventors: Carlos A. Cruz, Kingwood, TX (US); Yongwoo Inn, Bartlesville, OK (US); John R. Rathman, Bartlesville, OK (US); Youlu Yu, Bartlesville, OK (US); Ashish M. Sukhadia, Bartlesville, OK (US); Jay M. Chaffin, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 65 days.

(21) Appl. No.: 17/200,976

(22) Filed: Mar. 15, 2021

(65) Prior Publication Data
US 2022/0289880 A1   Sep. 15, 2022

(51) Int. Cl.
*C08F 10/02*   (2006.01)
*C08F 210/16*   (2006.01)
*C08F 210/02*   (2006.01)
*C08K 5/14*   (2006.01)

(52) U.S. Cl.
CPC .............. *C08F 210/02* (2013.01); *C08K 5/14* (2013.01); *C08F 10/02* (2013.01); *C08F 210/16* (2013.01)

(58) Field of Classification Search
None
See application file for complete search history.

(56) References Cited

U.S. PATENT DOCUMENTS

| | | | |
|---|---|---|---|
| 927,170 | A | 7/1909 | Harrya |
| 943,589 | A | 12/1909 | Bent |
| 3,248,178 | A | 4/1966 | Hoskinson |
| 4,501,885 | A | 2/1985 | Sherk |

(Continued)

FOREIGN PATENT DOCUMENTS

| | | |
|---|---|---|
| EP | 2172498 A1 | 4/2010 |
| EP | 2284197 B1 | 2/2016 |
| EP | 3116923 B1 | 5/2020 |

OTHER PUBLICATIONS

Bird, R. Byron, et al., "Dynamics of Polymeric Liquids," Fluid Mechanics, vol. 1, Second Edition, 1987, cover page, publishing page, pp. xiii-xviii, and 171-172, John Wiley & Sons, Inc.
Film Extrusion Manual—Process, Materials, Properties, TAPPI Press, 1992, 16 pages.
Hieber, C. A., et al., "Shear-rate-dependence modeling of polymer melt viscosity," Polymer Engineering and Science, Jul. 1992, pp. 931-938, vol. 32, No. 14.

(Continued)

*Primary Examiner* — Richard A Huhn
(74) *Attorney, Agent, or Firm* — Merchant & Gould P.C.

(57) ABSTRACT

Ethylene-based polymers are generally characterized by a high load melt index of less than 12 g/10 min, a weight-average molecular weight from 200,000 to 550,000 g/mol, a number-average molecular weight from 18,000 to 48,000 g/mol, a CY-a parameter of less than 0.12, a tan $\delta$ at 0.1 sec$^{-1}$ from 0.5 to 0.9 degrees, a tan $\delta$ at 100 sec$^{-1}$ from 0.5 to 0.75 degrees, and a viscosity at 0.001 sec$^{-1}$ from $1.3 \times 10^6$ to $1 \times 10^7$ Pa-sec. These ethylene polymers can be produced by peroxide-treating a bimodal molecular weight distribution dual metallocene-catalyzed resin, and can be used to produce blow molded bottles and other blow molded products.

20 Claims, 8 Drawing Sheets

(56) References Cited

U.S. PATENT DOCUMENTS

| | | | |
|---|---|---|---|
| 4,588,790 | A | 5/1986 | Jenkins, III |
| 5,352,749 | A | 10/1994 | Dechellis |
| 5,436,304 | A | 7/1995 | Griffin |
| 5,565,175 | A | 10/1996 | Hottovy |
| 5,575,979 | A | 11/1996 | Hanson |
| 5,578,682 | A | 11/1996 | White |
| 6,239,235 | B1 | 5/2001 | Hottovy |
| 6,262,191 | B1 | 7/2001 | Hottovy |
| 6,833,413 | B2 | 12/2004 | Sasagawa |
| 7,056,987 | B2 | 6/2006 | Borve |
| 7,531,606 | B2 | 5/2009 | Hendrickson |
| 7,598,327 | B2 | 10/2009 | Shaw |
| 8,822,608 | B1 | 9/2014 | Bhandarkar |
| 9,169,337 | B2 | 10/2015 | Rohatgi |
| 9,650,459 | B2 | 5/2017 | Greco |
| 2007/0007681 | A1 | 1/2007 | Chevillard |
| 2008/0226858 | A1 | 9/2008 | Walter |
| 2009/0188632 | A1 | 7/2009 | Cerciello |
| 2010/0133714 | A1 | 6/2010 | Jaker |
| 2010/0181095 | A1 | 7/2010 | Smedberg |
| 2014/0342141 | A1 | 11/2014 | Cui |
| 2021/0024728 | A1* | 1/2021 | Cruz ............... C08F 4/65927 |

OTHER PUBLICATIONS

Hieber, C. A., et al., "Some correlations involving the shear viscosity of polystyrene melts," Rheol Acta, 1989, pp. 321-332, vol. 28.

IUPAC Compendium of Chemical Terminology, 2nd Ed. 1997, pp. 1-1670.

Modern Plastics Encyclopedia, Mid-Nov. 1995 Issue, vol. 72, No. 12, 3 pages.

Yong W. Inn, et al., "Application of Creep Test to Obtain the Linear Viscoelastic Properties at Low Frequency Range for Polyethylene Melts," Applied Rheology, vol. 22, Issue 1, 2012, 8 pgs.

Youlu Yu, "A Short-Chain Branching Distribution Determination Technique for Polyethylene Using IR5-Detected GPC," Macromolecular Symposia, 2020, 390, 1900014, pp. 1-10.

Hans Zweifel, et al., "Plastics Additives Handbook 6th Edition," Organic Peroxides for Crosslinking, Chain-Scission and Grafting, Hanser Publishers, 2009, 15 pages.

International Search Report and Written Opinion issued in corresponding application No. PCT/US2022/071015, dated Jul. 7, 2022, 11 pp.

* cited by examiner

PEROXIDE TREATED BLOW MOLDING POLYMERS WITH INCREASED WEIGHT SWELL AND CONSTANT DIE SWELL

FIELD OF THE INVENTION

The present disclosure generally relates to the peroxide treatment of a bimodal polyolefin base resin to produce an ethylene polymer, and the subsequent use of the ethylene polymer to form blow molded products at a beneficial combination of both die swell and weight swell.

BACKGROUND OF THE INVENTION

Polyolefins such as high density polyethylene (HDPE) homopolymer and copolymer and linear low density polyethylene (LLDPE) copolymer can be produced using various combinations of catalyst systems and polymerization processes. Metallocene-based catalyst systems can, for example, produce ethylene polymers having good impact strength, tear resistance, and optical properties, but often at the expense of poor extrusion processability and melt strength. Chromium-based catalyst systems can, for example, produce ethylene-based polymers having good extrusion processability and polymer melt strength, typically due to their broad molecular weight distribution (MWD).

In some end-use applications, such as blow molding, it can be difficult to produce ethylene polymers, regardless of the catalyst system, that have acceptable levels of both die swell and weight swell. Accordingly, it is to these ends that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The present invention generally relates to ethylene polymers (e.g., ethylene/α-olefin copolymers) characterized by a high load melt index (HLMI) of less than or equal to 12 g/10 min, a weight-average molecular weight (Mw) in a range from 200,000 to 550,000 g/mol, a number-average molecular weight (Mn) in a range from 18,000 to 48,000 g/mol, a CY-a parameter of less than or equal to 0.12, a tan δ (tan d or tangent delta) at 0.1 sec$^{-1}$ in a range from 0.5 to 0.9 degrees, a tan δ at 100 sec$^{-1}$ in a range from 0.5 to 0.75 degrees, and a viscosity at 0.001 sec$^{-1}$ (eta@0.001 sec$^{-1}$ or η@0.001 sec$^{-1}$) in a range from $1.3 \times 10^6$ to $1 \times 10^7$ Pa-sec. These ethylene polymers can be used to produce various articles of manufacture, such as blow molded bottles and other blow molded products.

The ethylene polymers can be produced, for instance, by a process comprising contacting a base resin (e.g., an ethylene copolymer) with a peroxide compound to produce the ethylene polymer. In some aspects, the contacting step can comprise a step of melt processing a blend or mixture of the base resin and the peroxide compound at a suitable melt processing temperature, and often, the amount of peroxide groups ranges from 10 to 500 ppm, from 25 to 400 ppm, or from 50 to 350 ppm, based on the weight of the base resin. While not limited thereto, the base resin often can be characterized by a HLMI in a range from 2 to 40 g/10 min, a Mw in a range from 250,000 to 550,000 g/mol, a CY-a parameter in a range from 0.12 to 0.3, a tan δ at 0.1 sec$^{-1}$ in a range from 0.8 to 1.05 degrees, a tan δ at 100 sec$^{-1}$ in a range from 0.4 to 0.6 degrees, and a viscosity at 0.001 sec$^{-1}$ in a range from $1 \times 10^5$ to $3 \times 10^6$ Pa-sec.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

DEFINITIONS

Figure 1:
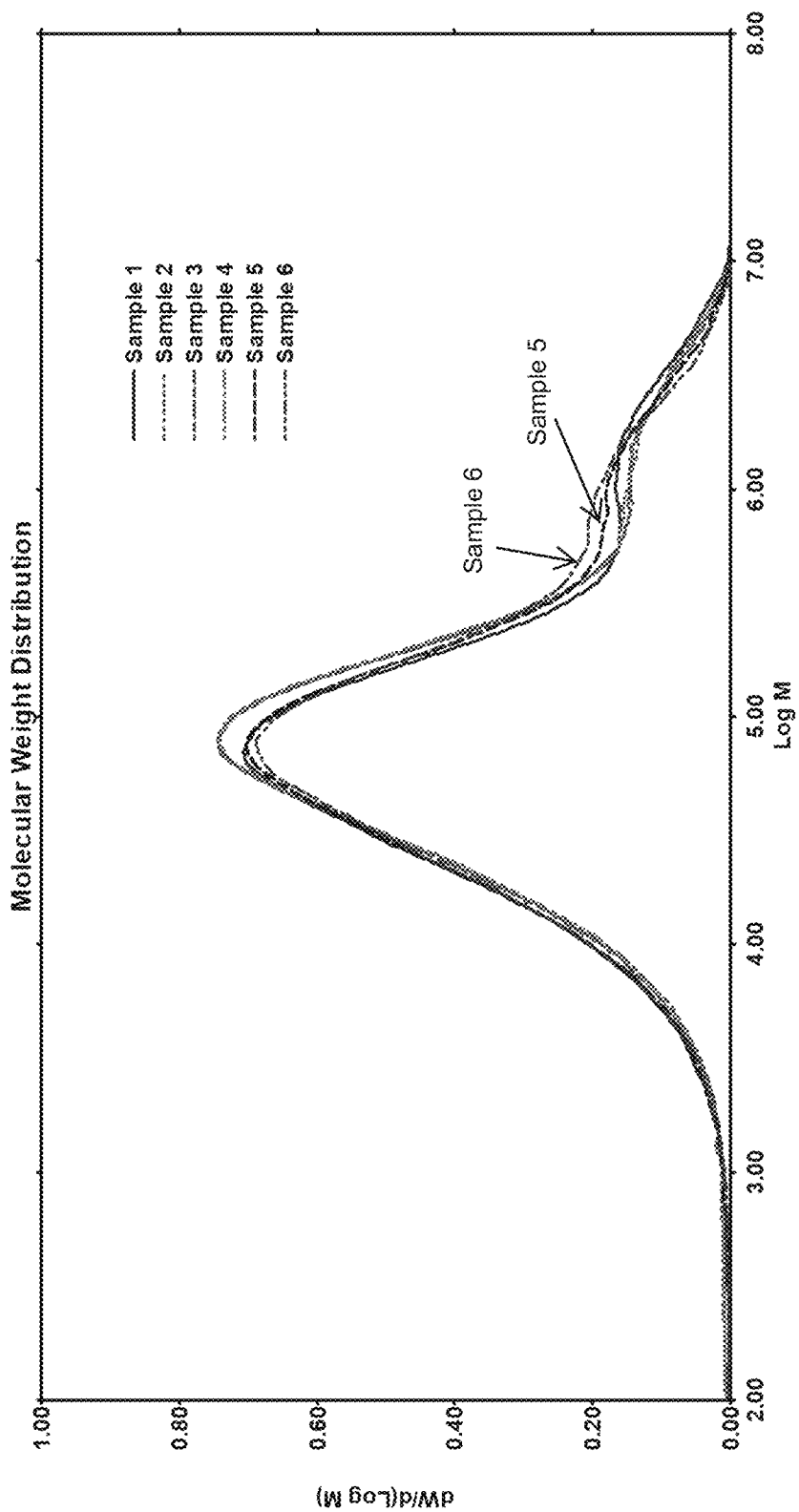
FIG. 1 presents a plot of the molecular weight distributions of the ethylene polymers of Examples 1-6.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and/or feature disclosed herein, all combinations that do not detrimentally affect the designs, compositions, and/or methods described herein are contemplated with or without explicit description of the particular combination. Additionally, unless explicitly recited otherwise, any aspect and/or feature disclosed herein can be combined to describe inventive features consistent with the present disclosure.

While compositions and methods are described herein in terms of "comprising" various components or steps, the compositions and methods also can "consist essentially of" or "consist of" the various components or steps, unless stated otherwise.

The terms "a," "an," "the," etc., are intended to include plural alternatives, e.g., at least one, unless otherwise specified. For instance, the disclosure of "an additive" or "a comonomer" is meant to encompass one, or mixtures or combinations of more than one, additive or comonomer, respectively, unless otherwise specified.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

The term "polymer" is used herein generically to include olefin homopolymers, copolymers, terpolymers, and the like, as well as alloys and blends thereof. The term "polymer" also includes impact, block, graft, random, and alternating copolymers. A copolymer is derived from an olefin monomer and one olefin comonomer, while a terpolymer is derived from an olefin monomer and two olefin comonomers. Accordingly, "polymer" encompasses copolymers and terpolymers derived from any olefin monomer and comonomer(s) disclosed herein. Similarly, the scope of the term "polymerization" includes homopolymerization, copolymerization, and terpolymerization. Therefore, an ethylene polymer includes ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer. The term "polymer" also includes all possible geometrical configurations, unless stated otherwise, and such configurations can include isotactic, syndiotactic, and random symmetries. Moreover, the "polymers" disclosed herein (e.g., ethylene polymers, base resins) also can be referred to herein as "polymer compositions."

The term "contacting" is used herein to refer to materials or components which can be blended, mixed, slurried, dissolved, reacted, treated, compounded, or otherwise contacted or combined in some other manner or by any suitable method. The materials or components can be contacted together in any order, in any manner, and for any length of time, unless otherwise specified.

Although any methods, devices, and materials similar or equivalent to those described herein can be used in the practice or testing of the invention, the typical methods, devices, and materials are herein described.

All publications and patents mentioned herein are incorporated herein by reference for the purpose of describing and disclosing, for example, the constructs and methodologies that are described in the publications, which might be used in connection with the presently described invention.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. As a representative example, the ratio of Mw/Mn of the ethylene polymer can be in certain ranges in various aspects of this invention. By a disclosure that the ratio of Mw/Mn can be in a range from 6.5 to 20, the intent is to recite that the ratio of Mw/Mn can be any ratio in the range and, for example, can include any range or combination of ranges from 6.5 to 20, such as from 7 to 17, from 7.5 to 15, or from 8 to 13, and so forth. Likewise, all other ranges disclosed herein should be interpreted in a manner similar to this example.

In general, an amount, size, formulation, parameter, range, or other quantity or characteristic is "about" or "approximate" whether or not expressly stated to be such. Whether or not modified by the term "about" or "approximately," the claims include equivalents to the quantities or characteristics.

DETAILED DESCRIPTION OF THE INVENTION

The present invention is directed generally to high molecular weight ethylene-based polymers having excellent melt strength and a broad molecular weight distribution. Such polymers can be converted on blow molding equipment to form various articles of manufacture.

Polymer swell characteristics upon exiting the accumulator head in blow molding equipment operations are critical. The correct swell is needed to fill the mold appropriately as well as to ensure that the part is of the proper weight (e.g., the proper wall thickness). Polymer swell characteristics encompass two different swell behaviors, die swell and weight swell. It is known in the industry that changes to the polymer architecture to increase swell simultaneously increases both die swell (e.g., how far the polymer parison expands in diameter upon exiting the accumulator head) and weight swell (e.g., how much polymer flows into the parison itself and increases the parison wall thickness compared to the die gap opening). Whether the polymer is a unimodal chromium-based resin or a bimodal dual metallocene-based resin, changes in the polymer architecture—such as molecular weight distribution—simultaneously increase or simultaneously decrease both die swell and weight swell.

Unexpectedly, and beneficially, the disclosed ethylene polymers (which have been treated with 10-300 ppm of active peroxide groups) demonstrate a divergence or decoupling of the die swell and weight swell characteristics. In particular, while the die swell is maintained constant, the weight swell can be surprisingly increased with increasing amounts of peroxide. Thus, the weight swell can increased or decreased, surprisingly, without impacting die swell, allowing blow molding equipment operators to independently control the part weight (e.g., the wall thickness of the part).

Ethylene Polymers

Generally, the polymers disclosed herein are ethylene-based polymers, or ethylene polymers, encompassing homopolymers of ethylene as well as copolymers, terpolymers, etc., of ethylene and at least one olefin comonomer. Comonomers that can be copolymerized with ethylene often can have from 3 to 20 carbon atoms in their molecular chain. For example, typical comonomers can include, but are not limited to, propylene, 1-butene, 1-pentene, 1-hexene, 1-heptene, 1-octene, and the like, or combinations thereof. In an aspect, the olefin comonomer can comprise a $C_3$-$C_{18}$ olefin; alternatively, the olefin comonomer can comprise a $C_3$-$C_{10}$ olefin; alternatively, the olefin comonomer can comprise a $C_4$-$C_{10}$ olefin; alternatively, the olefin comonomer can comprise a $C_3$-$C_{10}$ α-olefin; alternatively, the olefin comonomer can comprise a $C_4$-$C_{10}$ α-olefin; alternatively, the olefin comonomer can comprise 1-butene, 1-hexene, 1-octene, or any combination thereof, or alternatively, the comonomer can comprise 1-hexene.

In one aspect, the ethylene polymer of this invention can comprise an ethylene/α-olefin copolymer, while in another aspect, the ethylene polymer can comprise an ethylene homopolymer, and in yet another aspect, the ethylene polymer of this invention can comprise an ethylene/α-olefin copolymer and an ethylene homopolymer. For example, the ethylene polymer can comprise an ethylene/1-butene copolymer, an ethylene/1-hexene copolymer, an ethylene/1-octene copolymer, an ethylene homopolymer, or any combination thereof; alternatively, an ethylene/1-butene copolymer, an ethylene/1-hexene copolymer, an ethylene/1-octene copolymer, or any combination thereof, or alternatively, an ethylene/1-hexene copolymer.

An illustrative and non-limiting example of an ethylene polymer (e.g., an ethylene/α-olefin copolymer) described herein has a high load melt index (HLMI) of less than or equal to 12 g/10 min, a weight-average molecular weight (Mw) in a range from 200,000 to 550,000 g/mol, a number-average molecular weight (Mn) in a range from 18,000 to 48,000 g/mol, a CY-a parameter of less than or equal to 0.12, a tan δ (tan d or tangent delta) at 0.1 sec$^{-1}$ in a range from 0.5 to 0.9 degrees, a tan δ (tan d or tangent delta) at 100 sec$^{-1}$ in a range from 0.5 to 0.75 degrees, and a viscosity at 0.001 sec$^{-1}$ (eta@0.001 sec$^{-1}$ or η@ 0.001 sec$^{-1}$) in a range from $1.3 \times 10^6$ to $1 \times 10^7$ Pa-sec. This illustrative and non-limiting example of an ethylene polymer also can have any of the polymer properties listed below and in any combination, unless indicated otherwise.

The ethylene polymer has a very low melt index, as indicated by the high load melt index (HLMI) of less than or equal to 12 g/10 min. In some aspects, the HLMI of the ethylene polymer can be less than or equal to 10 or less than or equal to 8 g/10 min. Typical ranges for the HLMI include from 1 to 12 g/10 min, from 1 to 10 g/10 min, from 1 to 8 g/10 min, from 2 to 12 g/10 min, or from 2 to 10 g/10 min, and the like.

In an aspect, the ethylene polymer can have a Mw in a range from 200,000 to 500,000 g/mol, from 250,000 to 550,000 g/mol, from 250,000 to 500,000 g/mol, from 250,000 to 475,000 g/mol, from 275,000 to 550,000 g/mol, or from 275,000 to 475,000 g/mol. Additionally or alternatively, the ethylene polymer can have a ratio of Mw/Mn that falls within a range from 6.5 to 20, such as from 7 to 17, from 7.5 to 15, or from 8 to 13. Additionally or alternatively, the ethylene polymer can have a ratio of Mz/Mw that falls within a range from 4 to 9, such as from 4 to 8, from 4.5 to 7.5, or from 5 to 7.

In an aspect, the ethylene polymer can have a Mp in a range from 60,000 to 110,000 g/mol, from 65,000 to 105,000 g/mol, or from 70,000 to 100,000 g/mol. Additionally or alternatively, the ethylene polymer can have a Mn in a range from 20,000 to 46,000 g/mol, from 22,000 to 46,000 g/mol, from 20,000 to 42,000 g/mol, or from 22,000 to 40,000 g/mol. Additionally or alternatively, ethylene polymers consistent with certain aspects of the invention often can have a bimodal molecular weight distribution (as determined using gel permeation chromatography (GPC) or other related analytical technique). Generally, in a bimodal molecular weight distribution, there is a valley between the peaks, and the peaks can be separated or deconvoluted. Typically, a bimodal molecular weight distribution can be characterized as having an identifiable high molecular weight component (or distribution) and an identifiable low molecular weight component (or distribution). Illustrative unimodal MWD curves and bimodal MWD curves are shown in U.S. Pat. No. 8,383,754, incorporated herein by reference in its entirety.

The densities of ethylene-based polymers disclosed herein often are greater than or equal to 0.935 g/cm$^3$, and less than or equal to 0.965 g/cm$^3$. Yet, in particular aspects, the density can be in a range from 0.94 to 0.965 g/cm$^3$, from 0.945 to 0.965 g/cm$^3$, from 0.94 to 0.96 g/cm$^3$, from 0.945 to 0.96 g/cm$^3$, from 0.95 to 0.965 g/cm$^3$, or from 0.95 to 0.96 g/cm$^3$.

The ethylene polymers described herein have high viscosities at low shear rates, which translates into excellent polymer melt strength. The viscosity at 0.001 sec$^{-1}$ (eta @ 0.001 sec$^{-1}$ or η@0.001 sec$^{-1}$) at 190° C. generally falls within a range from $1.3 \times 10^6$ to $1 \times 10^7$ Pa-sec, such as from $1.3 \times 10^6$ to $6 \times 10^6$ Pa-sec; alternatively, from $1.3 \times 10^6$ to $5 \times 10^6$ Pa-sec; alternatively, from $1.5 \times 10^6$ to $1 \times 10^7$ Pa-sec; alternatively, from $1.5 \times 10^6$ to $6 \times 10^6$ Pa-sec; alternatively, from $1.5 \times 10^6$ to $5 \times 10^6$ Pa-sec; alternatively, from $2 \times 10^6$ to $6 \times 10^6$ Pa-sec; or alternatively, from $2 \times 10^6$ to $5 \times 10^6$ Pa-sec. In some aspects, the ethylene polymer can have a zero-shear viscosity ($\eta_0$) at 190° C. in a range from $1 \times 10^8$ to $1 \times 10^{30}$ Pa-sec, from $1 \times 10^8$ to $1 \times 10^{28}$ Pa-sec, from $1 \times 10^{10}$ to $1 \times 10^{30}$ Pa-sec, from $1 \times 10^{10}$ to $1 \times 10^{27}$ Pa-sec, or from $1 \times 10^{12}$ to $1 \times 10^{27}$ Pa-sec, and the like. Additionally or alternatively, the ethylene polymer can have a relaxation time ($\tau_n$) in a range from $5 \times 10^3$ to $1 \times 10^{25}$ sec, such as from $6 \times 10^3$ to $1 \times 10^{23}$ sec, from $1 \times 10^5$ to $1 \times 10^{25}$ sec, from $1 \times 10^5$ to $1 \times 10^{23}$ sec, or from $1 \times 10^7$ to $1 \times 10^{23}$ sec, and the like. The zero-shear viscosity and relaxation time are determined from viscosity data measured at 190° C. and using the Carreau-Yasuda (CY) empirical model as described herein, with creep adjustment.

The ethylene polymer can have a CY-a parameter of less than or equal to 0.12, for example, less than or equal to 0.11, less than or equal to 0.1, less than or equal to 0.08, or less than or equal to 0.06. Typically ranges include from 0.01 to 0.12, from 0.01 to 0.1, from 0.01 to 0.08, or from 0.01 to 0.06, and the like. Additionally or alternatively, the ethylene polymer can have a tan δ at 0.1 sec$^{-1}$ in a range from 0.5 to 0.9 degrees in one aspect, from 0.5 to 0.85 degrees in another aspect, from 0.5 to 0.8 degrees in another aspect, from 0.55 to 0.9 degrees in another aspect, from 0.55 to 0.85 degrees in another aspect, from 0.6 to 0.9 degrees in another aspect, from 0.6 to 0.85 degrees in still another aspect, and from 0.6 to 0.8 degrees in yet another aspect. Additionally or alternatively, the ethylene polymer can have a tan δ at 100 sec$^{-1}$ in a range from 0.5 to 0.75 degrees in one aspect, from 0.5 to 0.72 degrees in another aspect, from 0.5 to 0.7 degrees in another aspect, from 0.52 to 0.75 degrees in another aspect, from 0.52 to 0.72 degrees in another aspect, from 0.52 to 0.7 degrees in another aspect, from 0.55 to 0.75 degrees in yet another aspect, and from 0.55 to 0.72 degrees in still another aspect. Additionally or alternatively, the ethylene polymer can have a viscosity at 100 sec$^{-1}$ (eta@100 or η@ 100) at 190° C. in a range from 1700 to 3300, from 1800 to 3200, from 1900 to 3100, or from 2000 to 3000 Pa-sec. These rheological parameters are determined from viscosity data measured at 190° C. and using the Carreau-Yasuda (CY) empirical model described herein, with creep adjustment.

Moreover, the ethylene polymers can have a reverse comonomer distribution, generally, the higher molecular weight components of the polymer have higher comonomer incorporation than the lower molecular weight components. Typically, there is increasing comonomer incorporation with increasing molecular weight. In one aspect, the number of short chain branches (SCBs) per 1000 total carbon atoms of the polymer can be greater at Mw than at Mn. In another aspect, the number of SCBs per 1000 total carbon atoms of the polymer can be greater at Mz than at Mw. In yet another aspect, the number of SCBs per 1000 total carbon atoms of the polymer can be greater at Mz than at Mn.

In an aspect, the ethylene polymer described herein can be a reactor product (e.g., a single reactor product), for example, not a post-reactor blend of two polymers, for instance, having different molecular weight characteristics. As one of skill in the art would readily recognize, physical blends of two different polymer resins can be made, but this necessitates additional processing and complexity not required for a reactor product.

Moreover, the ethylene polymer can be produced from a base resin that can be made using a dual metallocene catalyst system. Ziegler-Natta and chromium based catalysts systems are not required. Therefore, the ethylene polymer can contain no measurable amount of chromium or titanium or vanadium or magnesium (catalyst residue), i.e., less than 0.1 ppm by weight. In some aspects, the ethylene polymer can contain, independently, less than 0.08 ppm, less than 0.05 ppm, or less than 0.03 ppm, of chromium (or titanium, or vanadium, or magnesium).

The ethylene polymer can be in any suitable form, such as fluff, powder, granulate, pellet, and the like. Often, the ethylene polymer is in pellet form. The ethylene polymer can contain one or more additives, non-limiting examples of which can include an antioxidant, an acid scavenger, an antiblock additive, a slip additive, a colorant, a filler, a processing aid, a UV inhibitor, and the like, as well as combinations thereof.

Aspects of this invention also are directed to the performance of these ethylene polymers (e.g., ethylene/1-hexene copolymers) on representative blow molding equipment, as described hereinbelow. Beneficially, the ethylene polymers can have a weight swell (as quantified by part weight in grams) that is decoupled from the die swell (as quantified by the layflat bottom in inches), and the difference between the two can depend upon the amount of peroxide used to produce the ethylene polymer. In one aspect, for instance, the ethylene polymer can have a ratio of weight swell to die swell (weight swell quantified by part weight in grams and die swell quantified by layflat bottom in inches) in a range from 200 to 280, from 210 to 270 in another aspect, from 230 to 280 in yet another aspect, and from 230 to 270 in still another aspect. Also beneficially, the ethylene polymers have exceptional melt strength during blow molding, which can be quantified by a hang time of at least 40 sec, and more often at least 50 sec, or at least 100 sec.

Consistent with aspects of the present invention, the ethylene polymer can be produced from a base resin (discussed herein below) via a process comprising contacting the base resin with a peroxide compound to produce the ethylene polymer (any ethylene polymer disclosed herein). Generally, the amount (ppm by weight) of the peroxide compound used in the process is of lesser interest, because the amount of peroxide groups is more important, and the molecular weight and the number of peroxide groups per peroxide compound are not consistent amongst all suitable peroxide compounds. Generally, the amount of peroxide groups, based on the weight of the base resin, can be in a range from 10 to 500 ppm, from 25 to 400 ppm, from 50 to 400 ppm, from 50 to 350 ppm, from 75 to 400 ppm, or from 100 to 300 ppm, of peroxide groups, based on the weight of the base resin.

The base resin and the peroxide compound, therefore, can be contacted at a temperature sufficient to generate peroxide groups at from 10 to 500 ppm, from 25 to 400 ppm, from 50 to 400 ppm, from 50 to 350 ppm, from 75 to 400 ppm, or from 100 to 300 ppm, of peroxide groups, based on the weight of the base resin.

In an aspect, the step of contacting the base resin with the peroxide compound can comprise melt processing a blend (or mixture) of the base resin and the peroxide compound at any suitable melt processing temperature, such as, for example, a temperature in a range from 120 to 300° C., a temperature in a range from 150 to 250° C., a temperature in a range from 175 to 225° C., and so forth. The appropriate temperature may depend upon the composition of the peroxide compound and the temperature at which it liberates peroxide groups. Prior to contacting the peroxide compound, the base resin can be in any suitable form including, for example, fluff, powder, granulate, pellet, solution, slurry, emulsion, and the like. Similarly, the peroxide compound can be in solid form, in liquid form, in a solution, or in a slurry. One particular method uses a masterbatch of the peroxide compound, and contacts the base resin (in fluff form) during melt processing. The masterbatch of the peroxide compound can contain any suitable organic or inorganic carrier, but often contains a high melt flow carrier resin, such as a polyethylene or polypropylene.

The present invention is not limited to any particular method of contacting and melt processing the base resin and the peroxide compound. Various methods of mixing and/or compounding can be employed, as would be recognized by those of skill in the art. In one aspect, the melt processing of the base resin and the peroxide compound can be performed in a single screw extrusion system. In another aspect, the melt processing of the base resin and the peroxide compound can be performed in a twin screw extrusion system (e.g., a counter-rotating mixer or a co-rotating twin screw extrusion system). The twin screw extrusion system can include any combination of feeding, melting, mixing, and conveying elements. For instance, the twin screw extrusion system can contain all or a majority of mixing elements.

The peroxide compound can be any compound containing one or more peroxide (O—O) groups, suitable examples of which can include, but are not limited to, 2,5-dimethyl-2,5-di(t-butylperoxy)hexane, dicumyl peroxide, t-butyl cumyl peroxide, n-butyl-4,4'-di(t-butylperoxy)valerate, and the like. The peroxide compound can be, for instance, added as a solid prill, dissolved in a mineral oil, or in a liquid form.

One or more additives also can be added during the conversion of the base resin (and peroxide compound) into the ethylene polymer. Non-limiting examples of suitable additives can include an antioxidant, an acid scavenger, an antiblock additive, a slip additive, a colorant, a filler, a processing aid, a UV inhibitor, and the like. Combinations of two or more additives can be contacted with the base resin and the peroxide compound, if desired.

Articles and Products

Articles of manufacture can be formed from, and/or can comprise, the ethylene polymers (e.g., ethylene copolymers) of this invention and, accordingly, are encompassed herein. For example, articles which can comprise the polymers of this invention can include, but are not limited to, an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product (e.g., panels for walls of an outdoor shed), outdoor play equipment (e.g., kayaks, bases for basketball goals), a pipe, a sheet or tape, a toy, or a traffic barrier, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers often are added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety. In some aspects of this invention, an article of manufacture can comprise any of the ethylene polymers described herein, and the article of manufacture can be or can comprise a blow molded product, such as a blow molded bottle.

Base Resins

Generally, the base resin used to produce the ethylene polymer can be any homopolymer of ethylene or copolymer, terpolymer, etc., of ethylene and at least one olefin comonomer disclosed hereinabove for the ethylene polymer. Thus, the base resin can comprise an ethylene/α-olefin copolymer, while in another aspect, the base resin can comprise an ethylene homopolymer, and in yet another aspect, the base resin can comprise an ethylene/α-olefin copolymer and an ethylene homopolymer. Accordingly, the base resin can comprise an ethylene/1-butene copolymer, an ethylene/1-hexene copolymer, an ethylene/1-octene copolymer, an ethylene homopolymer, or any combination thereof; alternatively, an ethylene/1-butene copolymer, an ethylene/1-hexene copolymer, an ethylene/1-octene copolymer, or any combination thereof; or alternatively, an ethylene/1-hexene copolymer. Typically, for example, if the base resin is an ethylene/1-hexene copolymer, then the ethylene polymer produced from the base resin also is an ethylene/1-hexene copolymer, although mixtures and combinations of various types of homopolymers and copolymers can be used.

In order to produce an ethylene polymer having the properties and benefits disclosed herein, a suitable base resin is used. An illustrative and non-limiting example of a base resin (e.g., an ethylene copolymer) of the present invention can have a HLMI in a range from 2 to 40 g/10 min, a Mw in a range from 250,000 to 550,000 g/mol, a CY-a parameter in a range from 0.12 to 0.3, a tan δ at 0.1 sec$^{-1}$ in a range from 0.8 to 1.05 degrees, a tan δ at 100 sec$^{-1}$ in a range from 0.4 to 0.6 degrees, and a viscosity at 0.001 sec$^{-1}$ in a range from $1 \times 10^5$ to $3 \times 10^6$ Pa-sec. This illustrative and non-limiting example of a base resin consistent with the present invention also can have any of the polymer properties listed below and in any combination, unless indicated otherwise.

The base resin used to produce the ethylene polymer, in some aspects, can have a HLMI in a range from 2 to 20 g/10 min, from 2 to 12 g/10 min, from 4 to 40 g/10 min, from 4 to 20 g/10 min, from 4 to 15 g/10 min, or from 4 to 12 g/10 min, and the like.

In an aspect, the base resin can have a Mw in a range from 250,000 to 500,000 g/mol, from 250,000 to 475,000 g/mol, from 300,000 to 550,000 g/mol, or from 300,000 to 500,000 g/mol. Additionally or alternatively, the base resin can have a ratio of Mw/Mn that falls within a range from 9 to 20, such as from 11 to 19, from 12 to 18, or from 13 to 16. Additionally or alternatively, the base resin can have a ratio of Mz/Mw that falls within a range from 4 to 9, such as from 5 to 8, from 5 to 7.5, or from 6 to 8.

In an aspect, the base resin can have a Mp in a range from 60,000 to 110,000 g/mol, from 65,000 to 105,000 g/mol, or from 65,000 to 100,000 g/mol. Additionally or alternatively, the base resin can have a Mn in a range from 18,000 to 48,000 g/mol, from 20,000 to 42,000 g/mol, or from 22,000 to 38,000 g/mol. Additionally or alternatively, the base resin used to produce the ethylene polymer often can have a bimodal molecular weight distribution (as determined using gel permeation chromatography (GPC) or other related analytical technique). Generally, in a bimodal molecular weight distribution, there is a valley between the peaks, and the peaks can be separated or deconvoluted. Typically, a bimodal molecular weight distribution can be characterized as having an identifiable high molecular weight component (or distribution) and an identifiable low molecular weight component (or distribution). Illustrative unimodal MWD curves and bimodal MWD curves are shown in U.S. Pat. No. 8,383,754, incorporated herein by reference in its entirety.

The densities of the base resin used to produce the ethylene polymers disclosed herein often are greater than or equal to 0.935 g/cm$^3$, and less than or equal to 0.965 g/cm$^3$. Yet, in particular aspects, the density can be in a range from 0.94 to 0.965 g/cm$^3$, from 0.945 to 0.965 g/cm$^3$, from 0.94 to 0.96 g/cm$^3$, from 0.945 to 0.96 g/cm$^3$, from 0.95 to 0.965 g/cm$^3$, or from 0.95 to 0.96 g/cm$^3$.

For the base resin, the viscosity at 0.001 sec$^{-1}$ (eta@0.001 sec$^{-1}$ or η@0.001 sec$^{-1}$) at 190° C. generally falls within a range from $1 \times 10^5$ to $2 \times 10^6$ Pa-sec; alternatively, from $1 \times 10^5$ to $1.8 \times 10^6$ Pa-sec; alternatively, from $8 \times 10^5$ to $3 \times 10^6$ Pa-sec; alternatively, from $8 \times 10^5$ to $2 \times 10^6$ Pa-sec; or alternatively, from $8 \times 10^5$ to $1.8 \times 10^6$ Pa-sec. In some aspects, the base resin can have a zero-shear viscosity ($\eta_0$) at 190° C. in a range from $1 \times 10^6$ to $1 \times 10^9$ Pa-sec, $1 \times 10^6$ to $2 \times 10^8$ Pa-sec, from $4 \times 10^6$ to $1 \times 10^9$ Pa-sec, or from $4 \times 10^6$ to $2 \times 10^8$ Pa-sec, and the like. As with the ethylene polymer, viscosity data is measured at 190° C. for the base resin and using the Carreau-Yasuda (CY) empirical model as described herein, with creep adjustment.

Typical ranges for the CY-a parameter for the base resin include from 0.12 to 0.25, from 0.13 to 0.3, from 0.13 to 0.25, or from 0.14 to 0.25, and the like. Additionally or alternatively, the base resin can have a tan δ at 0.1 sec$^{-1}$ in a range from 0.5 to 0.85 degrees in one aspect, from 0.8 to 1 degree in another aspect, from 0.83 to 1.05 degrees in another aspect, from 0.83 to 1 degree in another aspect, from 0.85 to 1.05 degrees in yet another aspect, and from 0.85 to 1 degree in still another aspect. Additionally or alternatively, the base resin can have a tan δ at 100 sec$^{-1}$ in a range from 0.4 to 0.58 degrees in one aspect, from 0.4 to 0.55 degrees in another aspect, from 0.45 to 0.6 degrees in another aspect, from 0.45 to 0.58 degrees in yet another aspect, and from 0.45 to 0.55 degrees in still another aspect. As above, these rheological parameters are determined from viscosity data measured at 190° C. and using the Carreau-Yasuda (CY) empirical model described herein, with creep adjustment.

Base resins described herein can have a reverse comonomer distribution, generally, the higher molecular weight components of the polymer have higher comonomer incorporation than the lower molecular weight components. Typically, there is increasing comonomer incorporation with increasing molecular weight. In one aspect, the number of short chain branches (SCBs) per 1000 total carbon atoms of the polymer can be greater at Mw than at Mn. In another aspect, the number of SCBs per 1000 total carbon atoms of the polymer can be greater at Mz than at Mw. In yet another aspect, the number of SCBs per 1000 total carbon atoms of the polymer can be greater at Mz than at Mn.

In an aspect, the base resin can be a reactor product (e.g., a single reactor product), for example, not a post-reactor blend of two polymers, for instance, having different molecular weight characteristics. As one of skill in the art would readily recognize, physical blends of two different polymer resins can be made, but this necessitates additional processing and complexity not required for a reactor product.

The base resin can be produced using a dual metallocene catalyst system, so Ziegler-Natta and chromium based catalysts systems are not required. Therefore, the base resin can contain no measurable amount of chromium or titanium or vanadium or magnesium (catalyst residue), i.e., less than 0.1 ppm by weight. In some aspects, the base resin can contain, independently, less than 0.08 ppm, less than 0.05 ppm, or less than 0.03 ppm, of chromium (or titanium, or vanadium, or magnesium).

Although one or more additives can be incorporated during the conversion of the base resin to the ethylene polymer, or during the conversion of the ethylene polymer to the blow molded product (or to other articles of manufacture), the base resin also can contain one or more suitable additives. Non-limiting examples of suitable additives can include an antioxidant, an acid scavenger, an antiblock additive, a slip additive, a colorant, a filler, a processing aid, a UV inhibitor, and the like. Combinations of two or more additives can be present in the base resin.

The performance of the base resin on representative blow molding equipment, as described herein, can be characterized in one aspect by a ratio of weight swell to die swell (weight:die) in a range from 150 to 225, from 180 to 225, or from 170 to 200. In another aspect, the base resin can be characterized by having a hang time in a range from 10 to 45 sec, from 15 to 45 sec, or from 20 to 45 sec.

Consistent with aspects of the present invention, the base resin can be produced using a dual metallocene catalyst system. While not limited thereto, catalyst component I can comprise a suitable unbridged metallocene compound, catalyst component II can comprise a suitable bridged metallocene compound, and the catalyst system also can comprise a suitable activator, and optionally, a suitable co-catalyst.

Referring first to catalyst component I, which can comprise an unbridged zirconium or hafnium based metallocene compound containing two cyclopentadienyl groups, two indenyl groups, or a cyclopentadienyl and an indenyl group. In one aspect, catalyst component I can comprise an unbridged zirconium or hafnium based metallocene compound containing two cyclopentadienyl groups. In another aspect, catalyst component I can comprise an unbridged zirconium or hafnium based metallocene compound containing two indenyl groups. In yet another aspect, catalyst component I can comprise an unbridged zirconium or hafnium based metallocene compound containing a cyclopentadienyl group and an indenyl group.

Referring now to catalyst component II, which can be a bridged metallocene compound. In one aspect, for instance, catalyst component II can comprise a bridged zirconium or hafnium based metallocene compound. In another aspect, catalyst component II can comprise a bridged zirconium or hafnium based metallocene compound with an alkenyl substituent. In yet another aspect, catalyst component II can comprise a bridged zirconium or hafnium based metallocene compound with an alkenyl substituent and a fluorenyl group. In still another aspect, catalyst component II can comprise a bridged zirconium or hafnium based metallocene compound with a cyclopentadienyl group and a fluorenyl group, and with an alkenyl substituent on the bridging group and/or on the cyclopentadienyl group. Further, catalyst component II can comprise a bridged metallocene compound having an aryl group substituent on the bridging group.

Additionally, the dual catalyst system contains an activator. For example, the catalyst system can contain an activator-support, an aluminoxane compound, an organoboron or organoborate compound, an ionizing ionic compound, and the like, or any combination thereof. The catalyst system can contain one or more than one activator. When present, the co-catalyst can include, but is not limited to, alkyl boron, alkyl aluminum, and alkyl zinc compounds, such as tri-n-butyl borane, tripropylborane, triethylborane, trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, dimethylzinc, diethylzinc, dipropylzinc, dibutylzinc, dineopentylzinc, and the like, or combinations thereof. Representative catalyst systems that can be used to produce the base resin are disclosed in U.S. Pat. Nos. 9,169,337, 9,273,170, 9,493,589, and 9,650,459, which are incorporated herein by reference in their entirety.

Base resins can be produced from these catalyst systems using any suitable olefin polymerization process using various types of polymerization reactors, polymerization reactor systems, and polymerization reaction conditions. One such olefin polymerization process for polymerizing olefins in the presence of a catalyst composition of the present invention can comprise contacting the catalyst composition with an ethylene and optionally an olefin comonomer (one or more) in a polymerization reactor system under polymerization conditions to produce the base resin.

As used herein, a "polymerization reactor" includes any polymerization reactor capable of polymerizing olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof; or alternatively, the polymerization reactor system can comprise a slurry reactor, a gas-phase reactor, a solution reactor, or a combination thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Polymerization reactor systems and processes also can include partial or full direct recycle of unreacted monomer, unreacted comonomer, and/or diluent.

A polymerization reactor system can comprise a single reactor or multiple reactors (2 reactors, more than 2 reactors, etc.) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. Representative gas phase reactors are disclosed in U.S. Pat. Nos. 5,352,749, 4,588,790, 5,436,304, 7,531,606, and 7,598,327, each of which is incorporated by reference in its entirety herein.

According to still another aspect, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the olefin polymer, hydrogen can be added to the polymerization reactor as needed (e.g., continuously, pulsed, etc.).

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. Various polymerization conditions can be held substantially constant, for example, for the production of a particular grade of the olefin polymer (or ethylene polymer). A suitable polymerization temperature can be any temperature below the de-polymerization temperature according to the Gibbs Free energy equation. Typically, this includes from 60° C. to 280° C., for example, or from 60° C. to 120° C., depending upon the type of polymerization reactor(s). In some reactor systems, the polymerization temperature generally can be within a range from 70° C. to 100° C., or from 75° C. to 95° C.

Suitable pressures will also vary according to the reactor and polymerization type. The pressure for liquid phase polymerizations in a loop reactor is typically less than 1000 psig (6.9 MPa). Pressure for gas phase polymerization is usually from 200 to 500 psig (1.4 MPa to 3.4 MPa). High pressure polymerization in tubular or autoclave reactors is generally run at 20,000 to 75,000 psig (138 to 517 MPa). Polymerization reactors can also be operated in a supercritical region occurring at generally higher temperatures and pressures. Operation above the critical point of a pressure/temperature diagram (supercritical phase) can offer advantages to the polymerization reaction process.

Consistent with aspects of this invention, the olefin monomer used in the polymerization process is ethylene, and the comonomer can comprise a $C_3$-$C_{10}$ alpha-olefin; alternatively, the comonomer can comprise 1-butene, 1-pentene, 1-hexene, 1-octene, 1-decene, styrene, or any combination thereof; alternatively, the comonomer can comprise 1-butene, 1-hexene, 1-octene, or any combination thereof; alternatively, the comonomer can comprise 1-butene; alternatively, the comonomer can comprise 1-hexene; or alternatively, the comonomer can comprise 1-octene.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

The high load melt index (HLMI, $I_{21}$, g/10 min) was determined in accordance with ASTM D1238 at 190° C. with a 21.6 kg weight. Density can be determined in grams per cubic centimeter (g/cm³) on a compression molded sample, cooled at 15° C. per hour, and conditioned for 40 hours at room temperature in accordance with ASTM D1505 and ASTM D4703.

Molecular weights and molecular weight distributions were obtained using a PL-GPC 220 (Polymer Labs, an Agilent Company) system equipped with a IR4 detector (Polymer Char, Spain) and three (3) Styragel HMW-6E GPC columns (Waters, Mass.) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were approximately 1 mg/mL, depending on the molecular weight. Sample preparation was conducted at 150° C. for nominally 4 hr with occasional and gentle agitation, before the solutions were transferred to sample vials for injection. An injection volume of about 400 µL was used. The integral calibration method was used to deduce molecular weights and molecular weight distributions using a broad Chevron Phillips Chemical Company's HDPE polyethylene resin, MARLEX BHB5003, as the standard. The integral table of the standard was pre-determined in a separate experiment with SEC-MALS. Mn is the number-average molecular weight, Mw is the weight-average molecular weight, Mz is the z-average molecular weight, and Mp is the peak molecular weight (location, in molecular weight, of the highest point of the molecular weight distribution curve).

Melt rheological characterizations were performed as follows. Small-strain (10%) oscillatory shear measurements were performed on an Anton Paar MCR 501 rheometer using parallel-plate geometry. All rheological tests were performed at 190° C. The complex viscosity |η*| versus frequency (w) data were then curve fitted using the modified three parameter Carreau-Yasuda (CY) empirical model to obtain the zero shear viscosity—$\eta_0$, characteristic viscous relaxation time—$\tau_n$, and the breadth parameter—a (CY-a parameter). The simplified Carreau-Yasuda (CY) empirical model is as follows.

$$|\eta^*(\omega)| = \frac{\eta_0}{[1+(\tau_\eta \omega)^a]^{(1-n)/a}},$$

wherein: |η*(ω)|=magnitude of complex shear viscosity;
$\eta_0$=zero shear viscosity;
$\tau_n$=viscous relaxation time (Tau(η) in sec);
a="breadth" parameter (CY-a parameter);
n=fixes the final power law slope, fixed at 2/11; and
ω=angular frequency of oscillatory shearing deformation.

Details of the significance and interpretation of the CY model and derived parameters can be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987); each of which is incorporated herein by reference in its entirety.

A creep adjustment was used to extend the low frequency range of rheological characterization to $10^{-4}$ sec$^{-1}$ (with the exception of the differential dynamic rheology plots, which were constructed without creep adjustment). In the creep test, a constant shear stress $\sigma_0$ was applied to the specimen and the shear strain γ was recorded as a function of creep time t. Although the time-dependent data generated by the creep and creep recovery tests look different from the frequency-dependent data measured in the dynamic frequency sweep test, as long as the measurements are performed in the linear viscoelastic regime, these two experimental data sets contain the same rheological information, so that the time-dependent creep compliance data can be transformed into the frequency-dependent dynamic data, and thus the long time creep measurement can supplement the low frequency data of the dynamic frequency sweep measurement. Details of the test method and analysis can be found in Y. W. Inn and D. C. Rohlfing, "Application of creep test to obtain the linear viscoelastic properties at low frequency range for polyethylene melts" *Applied Rheology* 22 (2012), incorporated herein by reference in its entirety.

The generalized Voigt model was used for modeling the time-dependent creep compliance J(t)=γ(t)/$\sigma_0$ in terms of a discrete spectrum $J_k$ of retardation times $\tau_k$ and zero shear rate viscosity $\eta_0$, $$J(t) = \sum_{k=1}^{N} J_k \left(1 - e^{-t/\tau_k}\right) + \frac{t}{\eta_0}.$$

If the discrete retardation spectrum accurately describes the compliance data, the theory of linear viscoelasticity permits a quantitative description of other types of experimental data, for example, the storage and the loss compliance calculated as $$J'(\omega) = \sum_{k=1}^{N} J_k \frac{1}{1+\omega^2\tau_k^2}, J''(\omega) = \frac{1}{\omega\eta_0} + \sum_{k=1}^{N} J_k \frac{\omega\tau_k}{1+\omega^2\tau_k^2}.$$

From the relationship between the complex modulus and the complex compliance, the storage and loss modulus of dynamic frequency sweep data can be obtained as $$G'(\omega) = \frac{J'(\omega)}{[J'(\omega)]^2 + [J''(\omega)]^2}, G'(\omega) = \frac{J''(\omega)}{[J'(\omega)]^2 + [J''(\omega)]^2}.$$

As a simple numerical approach to obtain the discrete spectrum of retardation times, the Microsoft Excel Solver tool can be used by minimizing the following objective function O.

$$O = \sum_{i=1}^{N} \frac{[J_{exp}(t_i) - J_{model}(t_i)]^2}{[J_{exp}(t_i)]^2}.$$

For reliable conversion of the time-dependent creep data into the frequency-dependent dynamic data, the frequency range needs to be limited by the testing time of the creep measurement. If it is possible to obtain precise experimental data over the entire range of creep time until the creep compliance reaches the steady state, the exact function of retardation spectra over the entire range of time scale also can be calculated. However, it is often not practical to obtain such data for high molecular weight polymers, which have very long relaxation times. The creep data only contain information within a limited range of time, so that the frequency range is limited by the duration time $t_N$ of the creep test, i.e., valid information for frequencies is in the range of $\omega > t_N^{-1}$, and the extrapolated data outside this frequency range can be influenced by artifacts of the fittings.

For the rheological measurements involving a creep adjustment, the polymer samples were compression molded at 182° C. for a total of 3 min. The samples were allowed to melt at a relatively low pressure for 1 min and then subjected to a high molding pressure for an additional 2 min. The molded samples were then quenched in a room temperature press, and then 25.4 mm diameter disks were stamped out of the molded slabs for the measurement in the rotational rheometer. The measurements were performed in parallel plates of 25 mm diameter at 190° C. using a controlled-stress rheometer equipped with an air bearing system (Physica MCR-501, Anton Paar). The test chamber of the rheometer was purged with nitrogen to minimize oxidative degradation. After thermal equilibration, the specimens were squeezed between the plates to a 1.6 mm thickness, and the excess was trimmed. A total of 8 min elapsed between the time the sample was inserted and the time the test was started. For the dynamic frequency sweep measurement, small-strain (1~10%) oscillatory shear in the linear viscoelastic regime was applied at angular frequencies from 0.0316 to 316 sec$^{-1}$. The creep test was performed for 10,200 sec (170 min) to limit the overall testing time within 4 hr, since sample throughput and thermal stability were concerns. By converting the time dependent creep data to frequency dependent dynamic data, the low frequency range was extended down to $10^{-4}$ rad/sec, two orders of magnitude lower than the frequency range of the dynamic test. The complex viscosity ($|\eta^*|$) versus frequency ($\omega$) data were curve fitted using the Carreau-Yasuda model.

One of the major concerns in performing the creep test, and indeed any long time scale measurement, was that the sample does not appreciably change during the measurement, which may take several hours to perform. If a polymer sample is heated for long time period without proper thermal stabilization (e.g., antioxidants), changes in the polymer can occur that can have a significant effect on the rheological behavior of the polymer and its characterization. Polymers which are being tested should have thermal stability for at least 4-5 hr at 190° C. under nitrogen; for example, ethylene polymers containing at least 0.4 wt. % of antioxidants were found to be stable enough to obtain valid creep adjustment data.

For the rheological measurement in the parallel plates, the specimen was squeezed between the plates to a 1.6 mm thickness, and then the excess was trimmed. When the sample was trimmed with large forces on one direction, some residual stress was generated to cause the strain to drift. Therefore, performing the creep test right after sample trimming should be avoided, because the residual stress can affect the subsequent creep measurement, particularly for the highly viscoelastic resins having long relaxation times. If the applied stress of the creep test is not large enough, the resulting strain can be so small that the creep results can be influenced by the artifact of the strain drifting. In order to minimize this effect, samples were trimmed as gently as possible, and the creep test was conducted after 2000 sec of waiting time, in order to allow relaxation of any residual stress.

The appropriate magnitude of applied stress $\sigma_0$ is important for reliable creep data. The stress $\sigma_0$ must be sufficiently small such that the strain will stay within the linear viscoelastic regime, and it must be sufficiently large such that the strain signal is strong enough to provide satisfactory resolution of data for good precision. Although not limited thereto, a suitable applied stress was equal to the complex modulus $|G^*|$ at a frequency of 0.01 rad/sec multiplied by 0.04.

Polymer viscosities at 0.001 sec$^{-1}$ (referred to as $\eta$ (0.001) or eta (0.001)) at 190° C. were determined with the Anton Paar MCR 501 rheometer using parallel-plate geometry.

Short chain branch (SCB) content and short chain branching distribution (SCBD) across the molecular weight distribution can be determined via an IR5-detected GPC system (IR5-GPC), wherein the GPC system was a PL220 GPC/SEC system (Polymer Labs, an Agilent company) equipped with three Styragel HMW-6E columns (Waters, Mass.) for polymer separation. A detailed description of the method can be found in the literature (Y. Yu, A Short-Chain Branching Distribution Determination Technique for Polyethylene Using IR5-Detected GPC, *Macromolecular Symposia*, 2020, 390, 1900014). Briefly, a thermoelectric-cooled IR5 MCT detector (IR5) (Polymer Char, Spain) is connected to the GPC columns via a hot-transfer line. Chromatographic data are obtained from two output ports of the IR5 detector. First, the analog signal goes from the analog output port to a digitizer before connecting to Computer "A" for molecular weight determinations via the Cirrus software (Polymer Labs, now an Agilent Company) and the integral calibration method using a broad HDPE MARLEX BHB5003 resin (Chevron Phillips Chemical) as the broad molecular weight standard. The digital signals, on the other hand, go via a USB cable directly to Computer "B" where they are collected by a LabView data collection software provided by Polymer Char. Chromatographic conditions are set as follows: column oven temperature of 145° C.; flowrate of 1 mL/min; injection volume of 0.4 mL; and polymer concentration of about 2 mg/mL, depending on sample molecular weight. The temperatures for both the hot-transfer line and IR5 detector sample cell are set at 150° C., while the temperature of the electronics of the IR5 detector is set at 60° C. Short chain branching content is determined via an in-house method using the intensity ratio of $CH_3$ ($I_{CH3}$) to $CH_2$ ($I_{CH2}$) coupled with a calibration curve. The calibration curve is a plot of SCB content ($x_{SCB}$) as a function of the intensity ratio of $I_{CH3}/I_{CH2}$. To obtain a calibration curve, a group of polyethylene resins (no less than 5) of SCB level ranging from zero to ca. 32 SCB/1,000 total carbons (SCB Standards) is used. All these SCB Standards have known SCB levels and flat SCBD profiles pre-determined separately by NMR and the solvent-gradient fractionation coupled with NMR (SGF-NMR) methods. Using SCB calibration curves thus established, profiles of short chain branching distribution across the molecular weight distribution are obtained for resins fractionated by the IR5-GPC system under exactly the same chromatographic conditions as for these SCB standards. A relationship between the intensity ratio and the elution volume is converted into SCB distribution as a function of MWD using a predetermined SCB calibration curve (i.e., intensity ratio of Imam vs. SCB content) and MW calibration curve (i.e., molecular weight vs. elution time) to convert the intensity ratio of Imam and the elution time into SCB content and the molecular weight, respectively. Although not tested, it was expected that the number of short chain branches (SCB) per 1000 total carbon atoms of the ethylene polymer (or the base resin) at Mw (or Mz) is greater than at Mn.

Metals content, such as the amount of catalyst residue in the ethylene polymer or article of manufacture, can be determined by ICP analysis on a PerkinElmer Optima 8300 instrument. Polymer samples can be ashed in a Thermolyne furnace with sulfuric acid overnight, followed by acid digestion in a HotBlock with HCl and $HNO_3$ (3:1 v:v).

Examples 1-17

Figure 2:
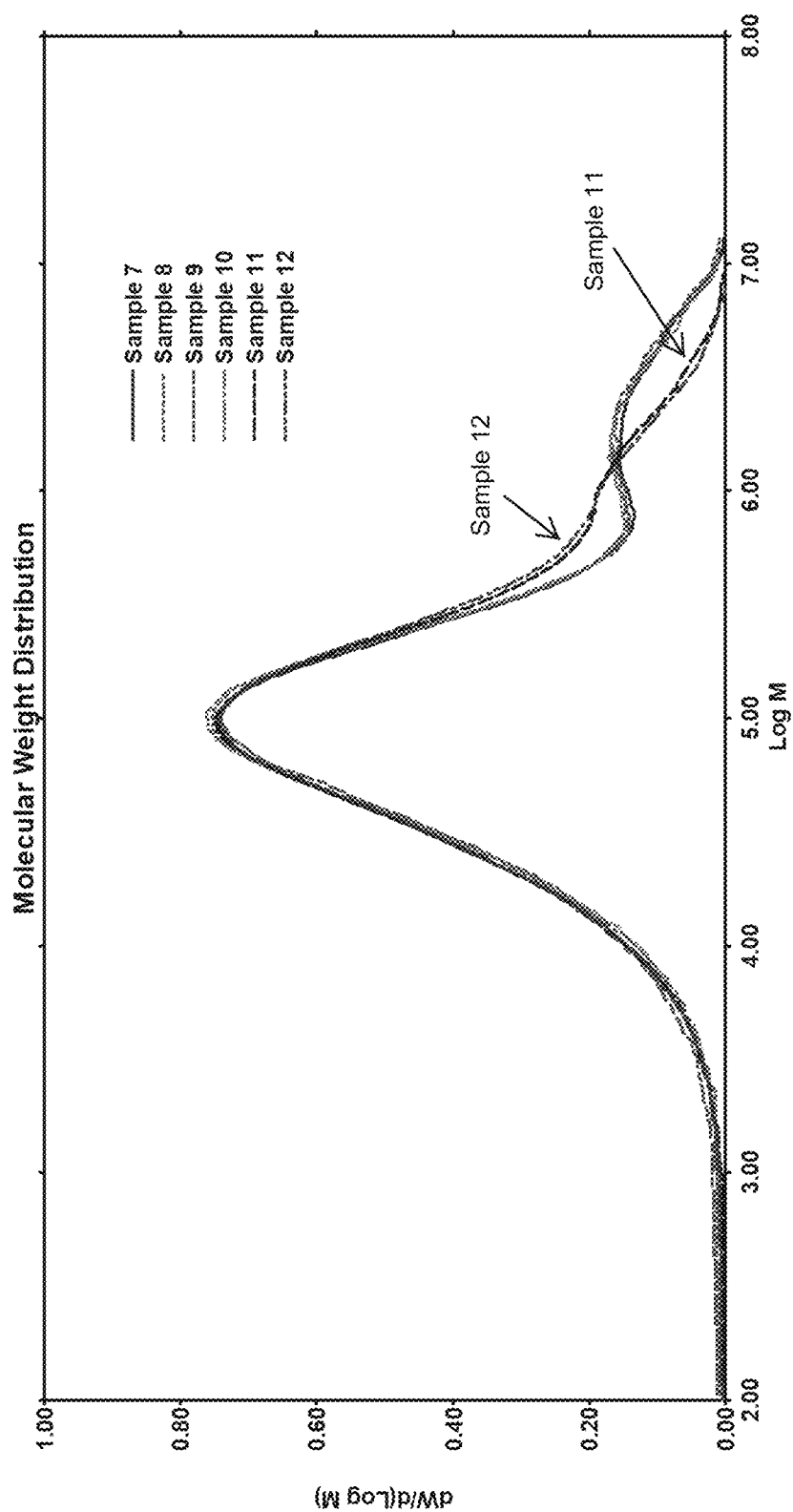
FIG. 2 presents a plot of the molecular weight distributions of the ethylene polymers of Examples 7-12.
Figure 3:
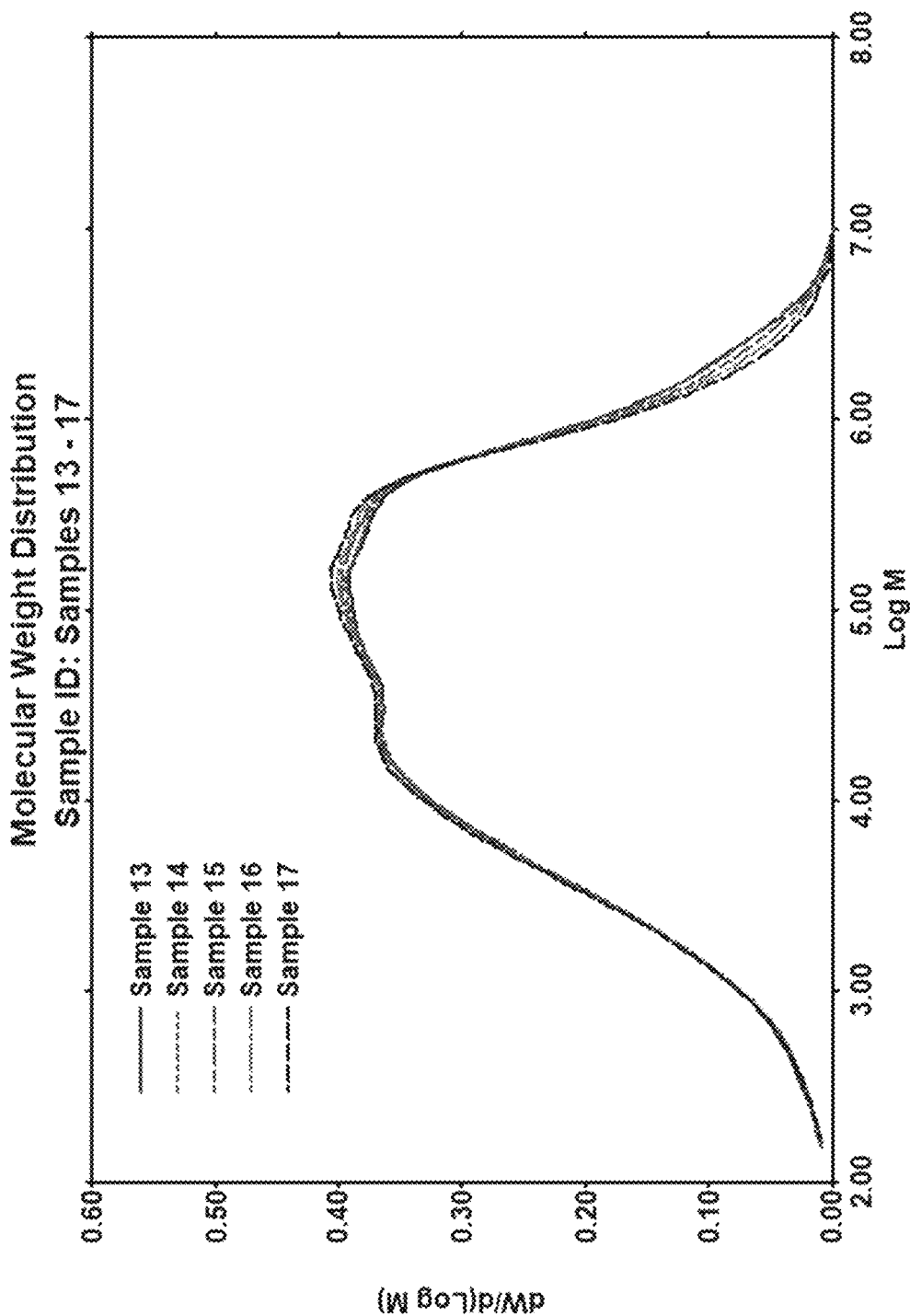
FIG. 3 presents a plot of the molecular weight distributions of the ethylene polymers of Examples 13-17.

FIG. 1 illustrates the bimodal molecular weight distributions (amount of polymer versus the logarithm of molecular weight) of the polymers of Examples 1-6, FIG. 2 illustrates the bimodal molecular weight distributions of the polymers of Examples 7-12, FIG. 3 illustrates the broad molecular weight distributions of the polymers of Examples 13-17, Table I summarizes polymer HLMI and certain molecular weight characteristics of the polymers of Examples 1-17 and Table II summarizes certain rheological characteristics at 190° C. for the polymers of Examples 1-12.

Example 13 was the base resin (no peroxide) for Examples 14-17, and is a broad ethylene copolymer resin, having a nominal 9 HLMI and 0.95 density (Chevron-Phillips Chemical Company LP). Base resin Example 1 (for Examples 1-6; nominal 8-12 HLMI and 0.955-0.96 density) and base resin Example 7 (for Examples 7-12; nominal 4.5-6.5 HLMI and 0.95-0.955 density) were produced using a dual metallocene catalyst system with an activator-support, as described below.

Fluorided silica-coated alumina activator-supports used to produce the base resins of Examples 1 and 7 were prepared as follows. Bohemite was obtained from W.R. Grace & Company under the designation "Alumina A" and having a surface area of about 300 $m^2/g$, a pore volume of about 1.3 mL/g, and an average particle size of about 100 microns. The alumina was first calcined in dry air at about 600° C. for approximately 6 hours, cooled to ambient temperature, and then contacted with tetraethylorthosilicate in isopropanol to equal 25 wt. % $SiO_2$. After drying, the silica-coated alumina was calcined at 600° C. for 3 hours. Fluorided silica-coated alumina (7 wt. % F) was prepared by impregnating the calcined silica-coated alumina with an ammonium bifluoride solution in methanol, drying, and then calcining for 3 hours at 600° C. in dry air. Afterward, the fluorided silica-coated alumina was collected and stored under dry nitrogen, and was used without exposure to the atmosphere.

Pilot plant polymerizations were conducted in a 30-gallon slurry loop reactor at a production rate of approximately 33 pounds of polymer per hour. Polymerization work was carried out under continuous particle form process conditions in a loop reactor (also referred to as a slurry process) by contacting a dual metallocene solution in isobutane, an organoaluminum solution (triisobutylaluminum, TIBA), and an activator-support (fluorided silica-coated alumina) in a 1-L stirred autoclave with continuous output to the loop reactor. The TIBA and dual metallocene solutions were fed as separate streams into a tee upstream of the autoclave where they contacted each other. The activator-support was flushed with isobutane at a point after the aforementioned tee, contacting the organoaluminum/metallocene mixture and flowing together to the autoclave. The isobutane flush used to transport the activator-support into the autoclave was set at a rate that would result in a residence time of approximately 30 minutes in the autoclave. The total flow from the autoclave then entered the loop reactor.

Ethylene used was polymerization grade ethylene obtained from AirGas which was purified through a column of alumina-zeolite adsorbent (activated at 230-290° C. in nitrogen). Polymerization grade 1-hexene (obtained from Chevron Phillips Chemical Company) which was purified by distillation and passed through a column of alumina-zeolite absorbent activated at 230-290° C. in nitrogen. The loop reactor was liquid full, 15.2 cm diameter, having a volume of 30 gallons (113.6 liters). Liquid isobutane was used as the diluent. Hydrogen was added at about 0.001-0.004 lb/hr to tune the molecular weight and/or HLMI of the polymer product. The isobutane was polymerization grade isobutane (obtained from Enterprise) that was further purified by distillation and subsequently passed through a column of alumina (activated at 230-290° C. in nitrogen). Co-catalyst TIBA was obtained as a 10-12 weight % solution in hydrocarbon and was further diluted to 2 weight percent in isobutane. The co-catalyst was added in a concentration in a range of 125 ppm based on the weight of the diluent in the polymerization reactor.

Reactor conditions included a reactor pressure around 590 psig, a mol % ethylene of 11-13% (based on isobutane diluent), and a polymerization temperature of 93-100° C. The reactor was operated to have a residence time of about 0.8-1.3 hr. Metallocene concentrations in the reactor were within a range of about 1.5 to 2.5 parts per million (ppm) by weight of the diluent. The activator-support (fluorided silica-coated alumina) was fed to the reactor at the rate of approximately 0.015-0.03 lb per hour. Polymer was removed from the reactor at the rate of about 33 lb/hr and passed through a flash chamber and a purge column. Nitrogen was fed to the purge column to ensure the fluff was hydrocarbon free. The structures for MET 1 and MET 2, used in Examples 1 and 7, are shown below:

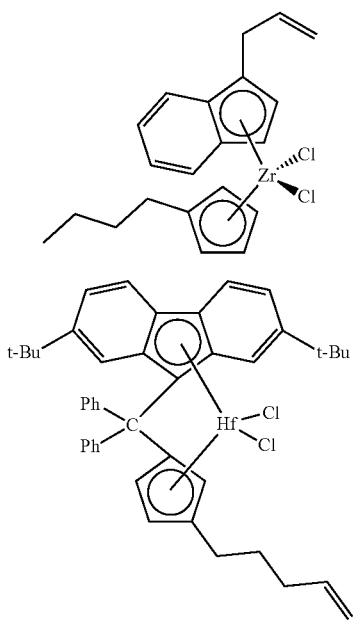

MET 1

MET 2

For Example 1, the ratio of MET2:MET1 was 0.67, the lb hydrogen per 1000 lb ethylene was 0.063, and the lb 1-hexene per lb of ethylene was 1.14, while for Example 7, the ratio of MET2:MET1 was 0.63, the lb hydrogen per 1000 lb ethylene was 0.031, and the lb 1-hexene per lb of ethylene was 1.14.

The ethylene polymers of Examples 2-6, 8-12, and 14-17 were prepared by blending the respective base resins of Examples 1, 7, and 13 with a masterbatch containing a polymer carrier resin and 2,5-dimethyl-2,5-di(t-butylperoxy)hexane. The amount of peroxide groups ranged from 10 to 300 ppm by weight of peroxide groups, based on the weight of the base resin, as shown in Table I and Table II. The blend of the base resin and peroxide masterbatch was compounded using a twin screw extrusion system (ZSK-300), and then pelletized to form the ethylene polymers of Examples 2-6, 8-12, and 14-17.

Certain properties of the polymers of Examples 1-17 are summarized in Table I and Table II. Many of the peroxide-treated polymers had HLMI values less than 12 g/10 min, Mw values from 200,000 to 550,000 g/mol, Mn values from 18,000 to 48,000 g/mol, CY-a parameters less than 0.12, tan δ at 0.1 sec$^{-1}$ values from 0.5 to 0.9 degrees, tan δ at 100 sec$^{-1}$ values from 0.5 to 0.75 degrees, and viscosities at 0.001 sec$^{-1}$ from $1.3 \times 10^6$ to $1 \times 10^7$ Pa-sec, such as Examples 4-6 and Examples 9-12. Generally, as the peroxide amount was increased, the zero-shear viscosity, the relaxation time, and the viscosity at 0.001 sec$^{-1}$ increased, while the CY-a parameter and the tan δ at 0.1 sec$^{-1}$ decreased.

Figure 4:
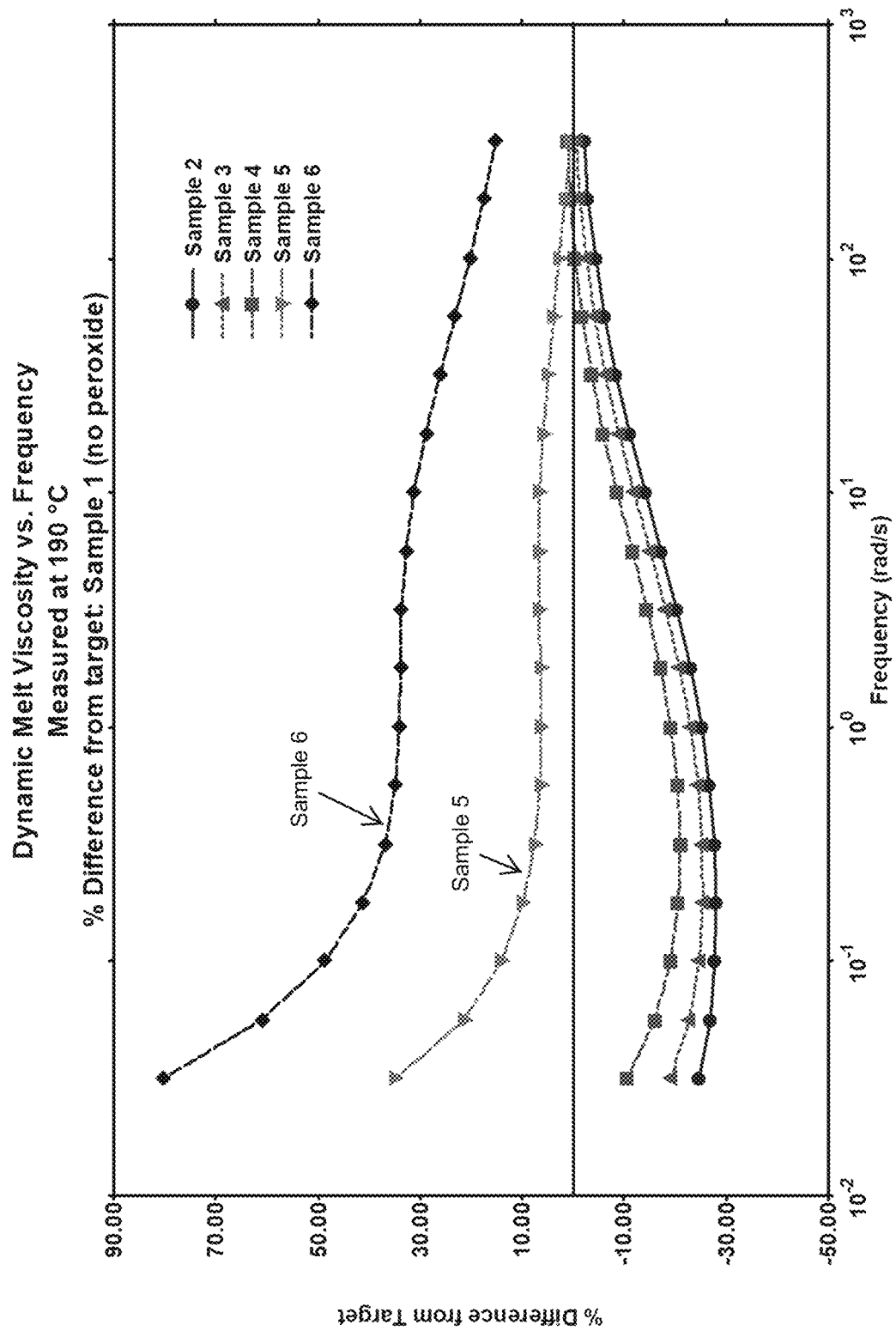
FIG. 4 presents a differential dynamic rheology plot at 190° C. illustrating the rheological differences between Examples 2-6 and the baseline of Example 1 at different shear rates.
Figure 5:
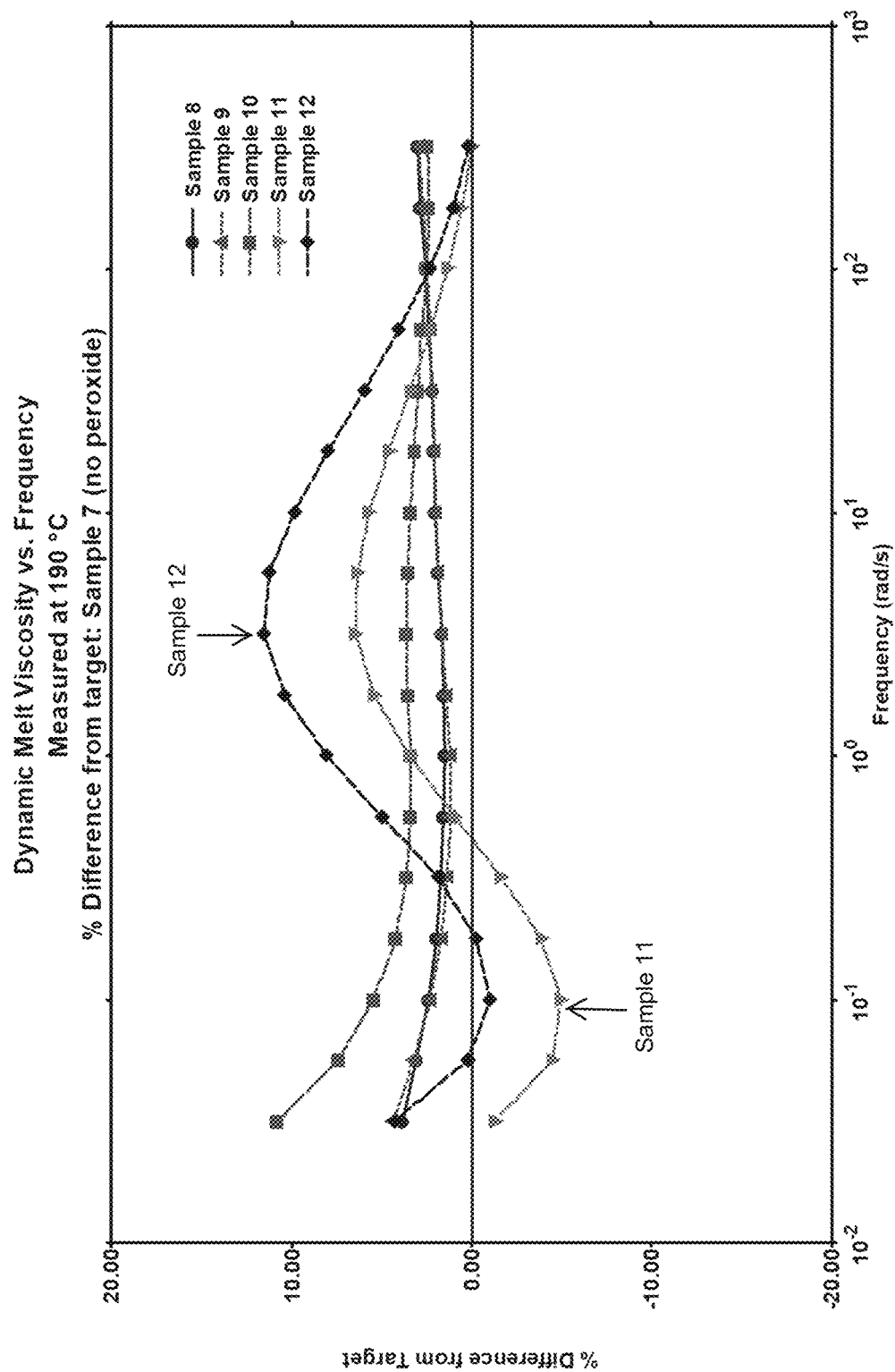
FIG. 5 presents a differential dynamic rheology plot at 190° C. illustrating the rheological differences between Examples 8-12 and the baseline of Example 7 at different shear rates.
Figure 6:
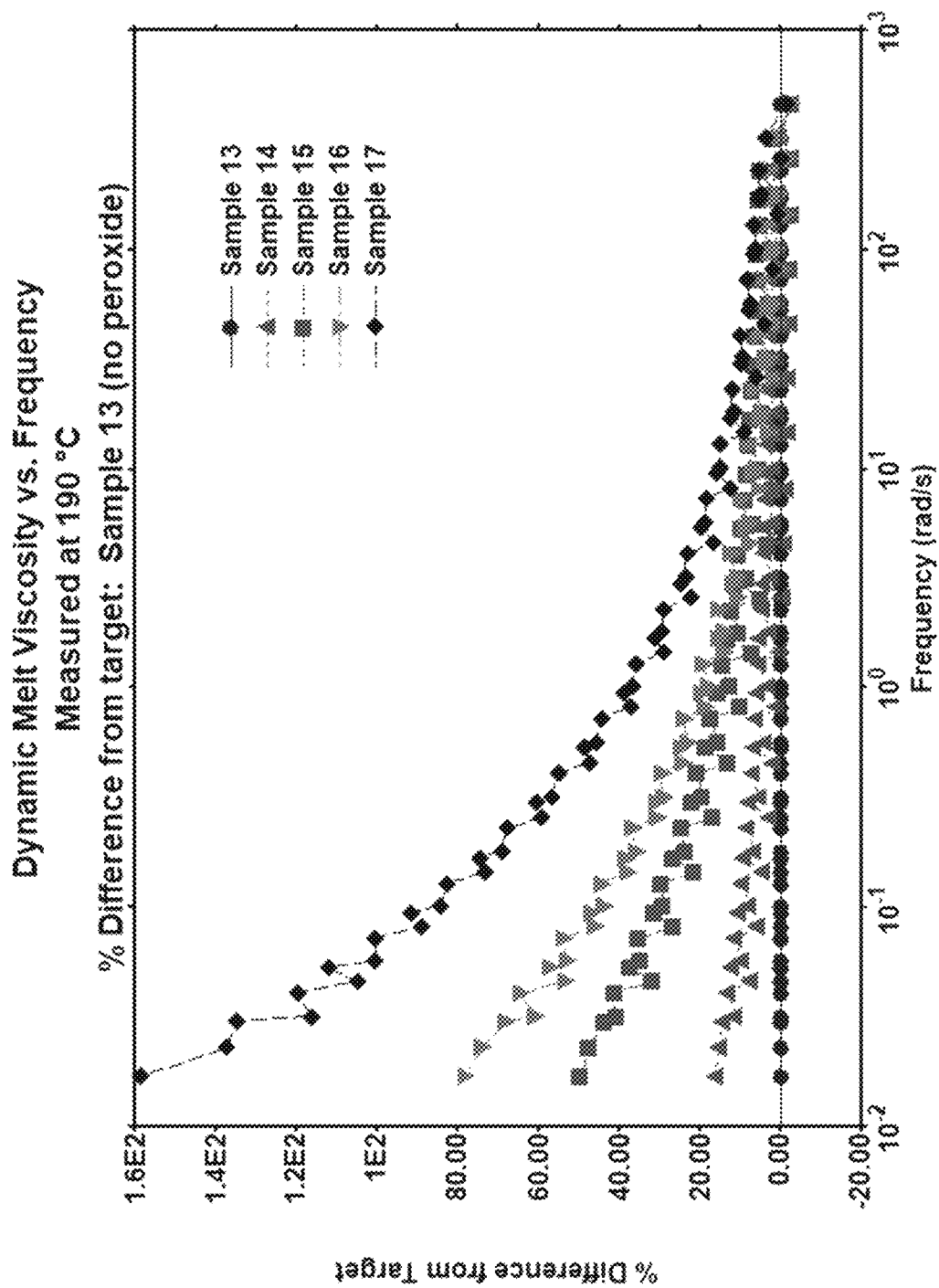
FIG. 6 presents a differential dynamic rheology plot at 190° C. illustrating the rheological differences between Examples 14-17 and the baseline of Example 13 at different shear rates.

FIG. 4 illustrates the rheological differences between Examples 2-6 and the baseline of Example 1 (no peroxide), FIG. 5 illustrates the rheological differences between Examples 8-12 and the baseline of Example 7 (no peroxide), and FIG. 6 illustrates the rheological differences between Examples 14-17 and the baseline of Example 13 (no peroxide). FIG. 6 demonstrates the expected impact of peroxide treatment on viscosity, particularly the steady increase of viscosity in the low shear regions as the peroxide addition amount was increased. In contrast, the impact of peroxide treatment shown in FIGS. 4-5 is unexpected, and while not wishing to be bound by theory, may be the result of differing amounts of chain scission versus cross-linking in the very high molecular weight fraction of the polymer—also note the surprising change in the shape of the MWD profile in FIGS. 1-2 at the high molecular weight end (e.g., from Log M of about 5.5 to 7).

Blow molding evaluations of Examples 1-6 were performed on a Sterling blow molding machine with the following specifications. These particular equipment and processing conditions were chosen because the blow molding performance and properties so obtained are typically representative of those obtained from larger, commercial scale blow molding operations. The extruder screw diameter was 3", the L/D Ratio was 24:1, the drive motor was a 75 HP DC drive, and the maximum plasticizing capacity was about 350 lb polyethylene per hr. The extruder was equipped with a dynicso pressure indicator, four heating zones with air cooling, and a smooth bore barrel with liquid cooling in the feed zone.

The accumulator head (FIFO Design) had a maximum shot capacity of 10 lb, a die bushing diameter maximum and minimum of 8" and 1" (respectively), where 1" thru 3½" is converging, and 4" thru 8" is diverging. The blow molding machine was also equipped with a 100 point MACO programmer.

For Examples 1-6, all extruder and head zones were set at 390° F. The mold was a 9-gallon bottle (Fremont Plastics Mold, 42" circumference), and 4.5" diverging die head with a 30 degree land angle was used. A constant push-out speed was used. The mold temperature was 50-60° F. The timer settings were a 0.5 sec blow delay, a 0 sec preblow, and a 0.25 sec clamp close delay. Air pressure was approximately 90 psig. The minimum wall thickness of the parts was in the 45-50 mil range, and the die gap was 0.196". Parts were produced at an extruder speed of 30 RPM and a blow time of 90 sec.

The weight of the product produced (part weight) was recorded, and the width of the flashing at the bottom of the product (layflat bottom) was measured. The weight swell of the polymer can be quantified by the part weight (grams), while the die swell of the polymer can be quantified by the layflat bottom (inches). The melt strengths of the polymers were compared via a hang time test using a 0.089" die gap and 20 RPM extruder speed. A parison was extruded and allowed to hang; the extruder speed was turned to zero while the parison was hanging. The time from the end of the shot to the time the parison tore away from the bushing was recorded as the hang time.

Blow molding evaluations of Examples 7-12 were performed on a Kautex KB-25 blow molding machine with the following specifications. These particular equipment and processing conditions were chosen because the blow molding performance and properties so obtained are typically representative of those obtained from larger, commercial scale blow molding operations. The extruder screw diameter was 80 mm, the L/D Ratio was 20:1, the drive motor was a 60 HP DC drive, and the maximum plasticizing capacity was about 330 lb polyethylene per hr. The extruder was equipped with a dynicso pressure indicator, three heating zones with air cooling, and a liquid cooled, grooved liner in the feed zone for processing high molecular weight polyethylene pellet and powder resins.

The accumulator head (FIFO Design) had a maximum shot capacity of 8.5 lb, a die bushing diameter maximum and minimum of 8" and 2" (respectively), where 2" thru 3½" is converging, and 4" thru 8" is diverging. The blow molding machine was also equipped with a 100 point Hunkar programmer.

For Examples 7-12, all extruder and head zones were set at 405° F. The mold was a 9-gallon bottle (Fremont Plastics Mold), and 4.5" diverging die head with a 30 degree land angle was used. A constant extrusion pressure was used. The mold temperature was 50-60° F. The timer settings were a 0.5 sec blow delay, a 0 sec preblow, and a 0 sec mold close delay. Air pressure was 90 psig. The minimum wall thickness of the parts was in the 45-50 mil range, and the die gap was 0.196". Parts were produced at an extruder speed of 30 RPM and a blow time of 90 sec.

The weight of the product produced (part weight) was recorded, and the width of the flashing at the bottom of the product (layflat bottom) was measured. The weight swell of the polymer can be quantified by the part weight (grams), while the die swell of the polymer can be quantified by the layflat bottom (inches). The melt strengths of the polymers were compared via a hang time test using a 0.089" die gap and 20 RPM extruder speed. A parison was extruded and allowed to hang. The time from the end of the shot to the time the parison tore away from the bushing was recorded as the hang time.

Figure 7:
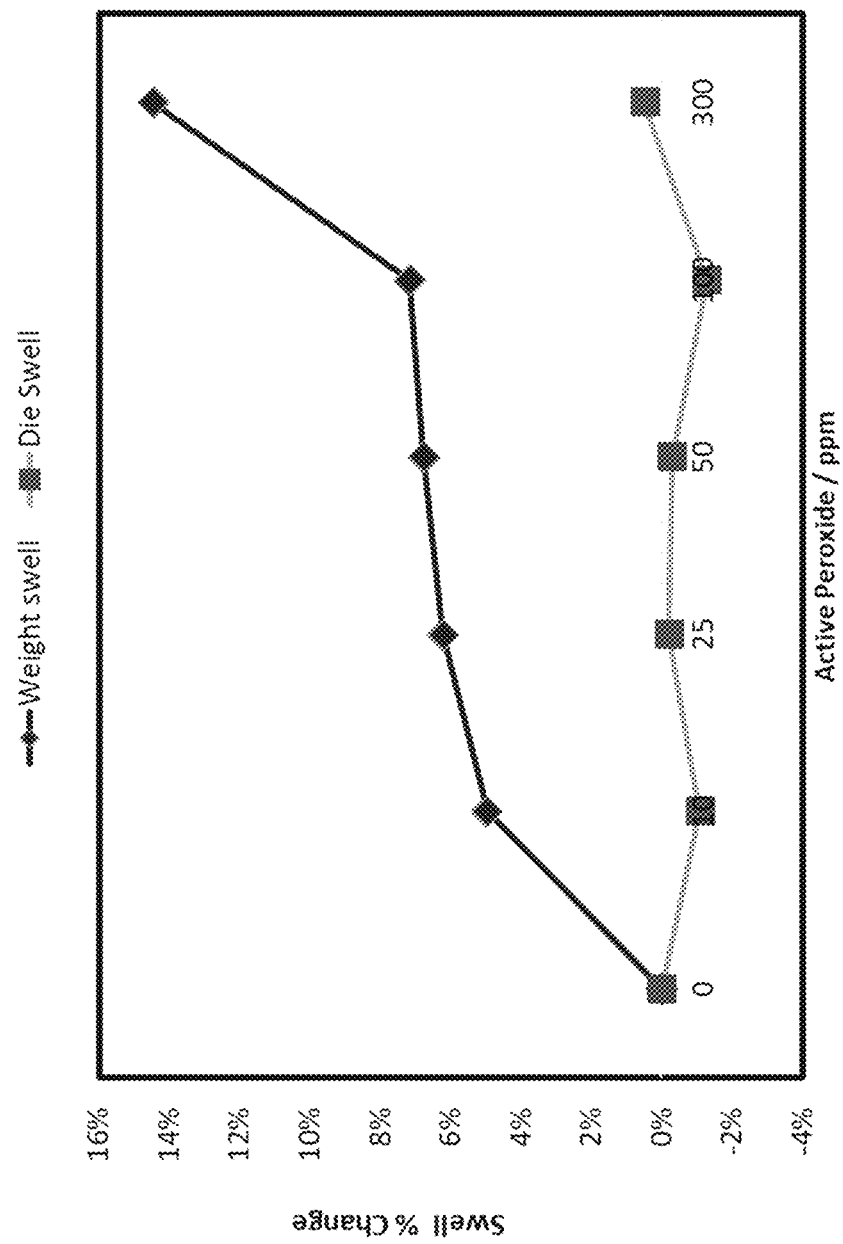
FIG. 7 presents a plot of die swell and weight swell based on the peroxide loadings of Examples 1-6.
Figure 8:
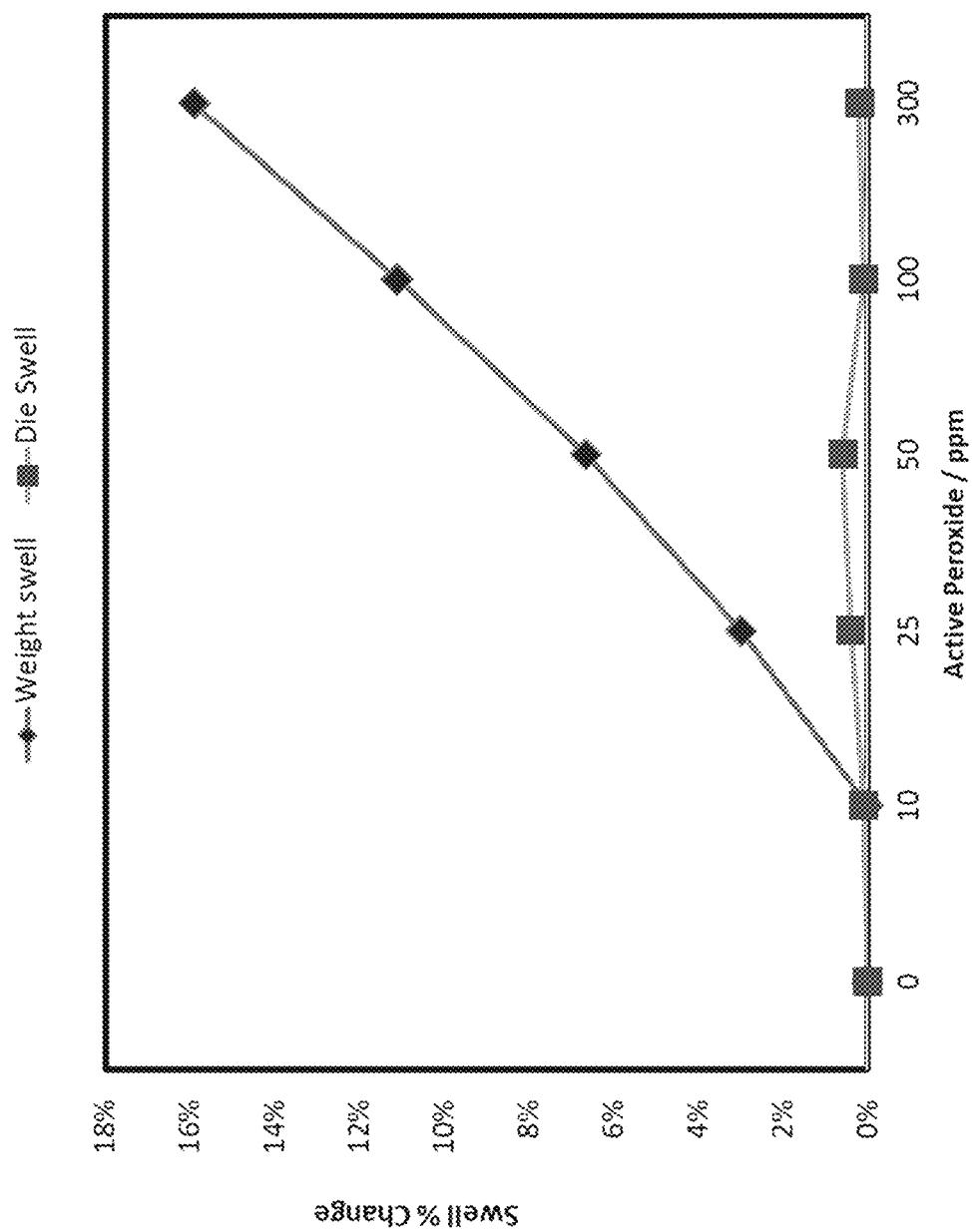
FIG. 8 presents a plot of die swell and weight swell based on the peroxide loadings of Examples 7-12.

Table III summarizes the blow molding performance of the polymers of Examples 1-12, FIG. 7 illustrates the die swell and weight swell properties for Examples 2-6 as compared to that of Example 1 (no peroxide), and FIG. 8 illustrates the die swell and weight swell properties for Examples 8-12 as compared to that of Example 7 (no peroxide). Unexpectedly, the table and figures demonstrate a decoupling of die swell and weight swell. In particular, the die swell (as quantified by the layflat bottom) was effectively the same for Examples 2-6 as compared to Example 1, and was effectively the same for Examples 8-12 as compared to Example 7, while the weight swell (as quantified by part weight) surprisingly increased with increased peroxide loading. Accordingly, the ratio of the part weight (grams) to layflat bottom (inches) was much greater for Examples 5-6 and Examples 11-12 when compared to Examples 1 and 7, respectively, which were not peroxide treated. Additionally, and beneficially, the peroxide treatment increased the melt strength of the polymer, as reflected by the hang times increasing with increasing addition amounts of peroxide.

TABLE I

| Example | HLMI g/10 min | Peroxide ppm | Mn/1000 g/mol | Mw/1000 g/mol | Mz/1000 g/mol | Mp/1000 g/mol | Mw/Mn | Mz/Mw | IB |
|---|---|---|---|---|---|---|---|---|---|
| 1 | — | 0 | 23.3 | 363 | 2590 | 69.4 | 15.6 | 7.14 | 1.41 |
| 2 | 9.53 | 10 | 30.6 | 337 | 2409 | 79.7 | 11.0 | 7.14 | 1.34 |
| 3 | 9.11 | 25 | 30.8 | 319 | 2192 | 75.8 | 10.4 | 6.86 | 1.34 |
| 4 | 7.69 | 50 | 30.2 | 328 | 2274 | 76.8 | 10.9 | 6.93 | 1.35 |
| 5 | — | 100 | 26.4 | 318 | 2064 | 73.0 | 12.1 | 6.49 | 1.42 |
| 6 | — | 300 | 25.1 | 306 | 1867 | 76.8 | 12.2 | 6.10 | 1.45 |
| 7 | — | 0 | 33.3 | 450 | 3148 | 94.0 | 13.5 | 7.00 | 1.34 |
| 8 | 4.78 | 10 | 44.1 | 487 | 3323 | 90.2 | 11.1 | 6.82 | 1.33 |
| 9 | 4.42 | 25 | 35.6 | 459 | 3100 | 100.8 | 12.9 | 6.76 | 1.35 |
| 10 | 3.82 | 50 | 41.8 | 446 | 2898 | 99.6 | 10.7 | 6.50 | 1.31 |
| 11 | 3.04 | 150 | 36.6 | 306 | 1713 | 96.4 | 8.4 | 5.59 | 1.34 |
| 12 | 2.50 | 300 | 35.3 | 287 | 1476 | 95.2 | 8.1 | 5.14 | 1.35 |
| 13 | 8.91 | 0 | 7.5 | 264 | 1502 | 133.1 | 35.3 | 5.69 | 2.55 |
| 14 | 8.28 | 15 | 7.6 | 268 | 1558 | 138.2 | 35.0 | 5.82 | 2.53 |
| 15 | 7.83 | 25 | 7.5 | 252 | 1470 | 160.7 | 33.7 | 5.82 | 2.51 |
| 16 | — | 50 | 7.6 | 240 | 1348 | 141.7 | 31.7 | 5.62 | 2.49 |
| 17 | — | 100 | 7.6 | 225 | 1226 | 156.7 | 29.4 | 5.45 | 2.46 |

TABLE II

| Example | Peroxide ppm | $\eta_0$ Pa-sec | $\tau_\eta$ sec | CY-a | $\eta$ (0.001) Pa-sec | Tan d@0.1 degrees | $\eta$ (100) Pa-sec | Tan d@100 degrees |
|---|---|---|---|---|---|---|---|---|
| 1 | 0 | 6.00E+06 | 9.52E+01 | 0.217 | 9.73E+05 | 0.978 | 2052 | 0.472 |
| 2 | 10 | 1.09E+08 | 9.29E+02 | 0.119 | 9.32E+05 | 0.948 | 1973 | 0.609 |
| 3 | 25 | 5.84E+08 | 4.59E+03 | 0.101 | 1.10E+06 | 0.903 | 2020 | 0.622 |
| 4 | 50 | 1.31E+11 | 9.13E+05 | 0.069 | 1.51E+06 | 0.822 | 2083 | 0.640 |
| 5 | 100 | 7.46E+15 | 2.57E+11 | 0.047 | 2.96E+06 | 0.681 | 2202 | 0.582 |
| 6 | 300 | 1.30E+26 | 2.59E+22 | 0.027 | 4.53E+06 | 0.626 | 2616 | 0.575 |
| 7 | 0 | 1.00E+08 | 1.09E+03 | 0.141 | 1.66E+06 | 0.883 | 2690 | 0.541 |
| 8 | 10 | 2.90E+08 | 3.02E+03 | 0.125 | 1.87E+06 | 0.857 | 2765 | 0.555 |
| 9 | 25 | 5.74E+08 | 6.03E+03 | 0.116 | 1.98E+06 | 0.841 | 2767 | 0.560 |
| 10 | 50 | 1.17E+12 | 1.20E+07 | 0.067 | 2.67E+06 | 0.758 | 2824 | 0.602 |
| 11 | 150 | 2.89E+20 | 3.25E+14 | 0.029 | 2.53E+06 | 0.769 | 2925 | 0.691 |
| 12 | 300 | 1.18E+24 | 4.05E+18 | 0.025 | 3.14E+06 | 0.723 | 2933 | 0.662 |

TABLE III

| Example | Peroxide ppm | Part Weight grams | Part Weight % change vs no peroxide | Layflat Bottom inches | Layflat Bottom % change vs no peroxide | Hang time seconds | Part Weight to Layflat Bottom ratio in grams/inch |
|---|---|---|---|---|---|---|---|
| 1 | 0 | 1996 | 0 | 10.08 | 0 | 21 | 198 |
| 2 | 10 | 2095 | 5 | 9.97 | −1 | 22 | 210 |
| 3 | 25 | 2120 | 6 | 10.06 | 0 | 28 | 211 |
| 4 | 50 | 2131 | 7 | 10.05 | 0 | 42 | 212 |
| 5 | 100 | 2139 | 7 | 9.95 | −1 | 93 | 215 |
| 6 | 300 | 2285 | 14 | 10.13 | 0 | 180 | 226 |
| 7 | 0 | 2269 | 0 | 10.05 | 0 | 42 | 226 |
| 8 | 10 | 2269 | 0 | 10.06 | 0 | 48 | 226 |
| 9 | 25 | 2337 | 3 | 10.09 | 0 | 72 | 232 |
| 10 | 50 | 2420 | 7 | 10.11 | 1 | 180 | 239 |
| 11 | 150 | 2521 | 11 | 10.06 | 0 | 180 | 251 |
| 12 | 300 | 2630 | 16 | 10.07 | 0 | 180 | 261 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. An ethylene polymer having (or characterized by):
a high load melt index of less than or equal to 12 g/10 min;
a weight-average molecular weight in a range from 200,000 to 550,000 g/mol;
a number-average molecular weight in a range from 18,000 to 48,000 g/mol;
a CY-a parameter of less than or equal to 0.12;
a tan δ at 0.1 sec$^{-1}$ in a range from 0.5 to 0.9 degrees;
a tan δ at 100 sec$^{-1}$ in a range from 0.5 to 0.75 degrees; and
a viscosity at 0.001 sec$^{-1}$ in a range from $1.3 \times 10^6$ to $1 \times 10^7$ Pa-sec.

Aspect 2. The polymer defined in aspect 1, wherein the ethylene polymer has a HLMI in any range disclosed herein, e.g., less than or equal to 10, less than or equal to 8, from 1 to 12, from 1 to 10, from 1 to 8, from 2 to 12, from 2 to 10 g/10 min, etc.

Aspect 3. The polymer defined in aspect 1 or 2, wherein the ethylene polymer has a Mw in any range disclosed herein, e.g., from 200,000 to 500,000, from 250,000 to 550,000, from 250,000 to 500,000, from 250,000 to 475,000, from 275,000 to 550,000, from 275,000 to 475,000 g/mol, etc.

Aspect 4. The polymer defined in any one of the preceding aspects, wherein the ethylene polymer has a CY-a parameter in any range disclosed herein, e.g., less than or equal to 0.11, less than or equal to 0.1, less than or equal to 0.08, less than or equal to 0.06, from 0.01 to 0.12, from 0.01 to 0.1, from 0.01 to 0.08, from 0.01 to 0.06, etc.

Aspect 5. The polymer defined in any one of the preceding aspects, wherein the ethylene polymer has a tan δ at 0.1 sec$^{-1}$ in any range disclosed herein, e.g., from 0.5 to 0.85 degrees, from 0.5 to 0.8 degrees, from 0.55 to 0.9 degrees, from 0.55 to 0.85 degrees, from 0.6 to 0.9 degrees, from 0.6 to 0.85 degrees, from 0.6 to 0.8 degrees, etc.

Aspect 6. The polymer defined in any one of the preceding aspects, wherein the ethylene polymer has a tan δ at 100 sec$^{-1}$ in any range disclosed herein, e.g., from 0.5 to 0.72 degrees, from 0.5 to 0.7 degrees, from 0.52 to 0.75 degrees, from 0.52 to 0.72 degrees, from 0.52 to 0.7 degrees, from 0.55 to 0.75 degrees, from 0.55 to 0.72 degrees, etc.

Aspect 7. The polymer defined in any one of the preceding aspects, wherein the ethylene polymer has a viscosity at 0.001 sec$^{-1}$ in any range disclosed herein, e.g., from $1.3 \times 10^6$ to $5.5 \times 10^6$ Pa-sec, from $1.3 \times 10^6$ to $5 \times 10^6$ Pa-sec, from $1.5 \times 10^6$ to $1 \times 10^7$ Pa-sec, from $1.5 \times 10^6$ to $6 \times 10^6$ Pa-sec, from $1.5 \times 10^6$ to $5 \times 10^6$ Pa-sec, from $2 \times 10^6$ to $6 \times 10^6$ Pa-sec, from $2 \times 10^6$ to $5 \times 10^6$ Pa-sec, etc.

Aspect 8. The polymer defined in any one of the preceding aspects, wherein the ethylene polymer has a viscosity at 100 sec$^{-1}$ in any range disclosed herein, e.g., from 1700 to 3300, from 1800 to 3200, from 1900 to 3100, from 2000 to 3000 Pa-sec, etc.

Aspect 9. The polymer defined in any one of the preceding aspects, wherein the ethylene polymer has a zero-shear viscosity in any range disclosed herein, e.g., from $1 \times 10^8$ to $1 \times 10^{30}$ Pa-sec, $1 \times 10^8$ to $1 \times 10^{28}$ Pa-sec, from $1 \times 10^{10}$ to $1 \times 10^{30}$ Pa-sec, from $1 \times 10^{10}$ to $1 \times 10^{27}$ Pa-sec, from $1 \times 10^{12}$ to $1 \times 10^{27}$ Pa-sec, etc.

Aspect 10. The polymer defined in any one of the preceding aspects, wherein the ethylene polymer has a density in any range disclosed herein, e.g., from 0.935 to 0.965, from 0.94 to 0.965, from 0.945 to 0.965, from 0.94 to 0.96, from 0.945 to 0.96 g/cm$^3$, etc.

Aspect 11. The polymer defined in any one of the preceding aspects, wherein the ethylene polymer has a reverse comonomer distribution, e.g., the number of short chain branches (SCBs) per 1000 total carbon atoms of the polymer at Mw is greater than at Mn, the number of SCBs per 1000 total carbon atoms of the polymer at Mz is greater than at Mw, the number of SCBs per 1000 total carbon atoms of the polymer at Mz is greater than at Mn, etc.

Aspect 12. The polymer defined in any one of the preceding aspects, wherein the ethylene polymer has a Mp in any range disclosed herein, e.g., from 60,000 to 110,000, from 65,000 to 105,000, from 70,000 to 100,000 g/mol, etc.

Aspect 13. The polymer defined in any one of the preceding aspects, wherein the ethylene polymer has a Mn in any range disclosed herein, e.g., from 20,000 to 46,000, from 22,000 to 46,000, from 20,000 to 42,000, from 22,000 to 40,000 g/mol, etc.

Aspect 14. The polymer defined in any one of the preceding aspects, wherein the ethylene polymer has a ratio of Mw/Mn in any range disclosed herein, e.g., from 6.5 to 20, from 7 to 17, from 7.5 to 15, from 8 to 13, etc.

Aspect 15. The polymer defined in any one of the preceding aspects, wherein the ethylene polymer has a ratio of Mz/Mw in any range disclosed herein, e.g., from 4 to 9, from 4 to 8, from 4.5 to 7.5, from 5 to 7, etc.

Aspect 16. The polymer defined in any one of the preceding aspects, wherein the ethylene polymer has a relaxation time ($\tau_n$) in any range disclosed herein, e.g., from $5\times10^3$ to $1\times10^{25}$ sec, from $6\times10^3$ to $1\times10^{23}$ sec, from $1\times10^5$ to $1\times10^{25}$ sec, from $1\times10^5$ to $1\times10^{23}$ sec, from $1\times10^7$ to $1\times10^{23}$ sec, etc.

Aspect 17. The polymer defined in any one of the preceding aspects, wherein the ethylene polymer has a ratio of weight swell to die swell (weight:die) in any range disclosed herein, e.g., from 200 to 280, from 210 to 270, from 230 to 280, from 230 to 270, etc., and/or the ethylene polymer has a hang time in any range disclosed herein, e.g., at least 40 sec, at least 50 sec, at least 100 sec, etc.

Aspect 18. The polymer defined in any one of the preceding aspects, wherein the ethylene polymer has a bimodal molecular weight distribution.

Aspect 19. The polymer defined in any one of the preceding aspects, wherein the ethylene polymer is a single reactor product, e.g., not a post-reactor blend of two polymers, for instance, having different molecular weight characteristics.

Aspect 20. The polymer defined in any one of the preceding aspects, wherein the ethylene polymer comprises an ethylene/α-olefin copolymer.

Aspect 21. The polymer defined in any one of the preceding aspects, wherein the ethylene polymer comprises an ethylene homopolymer, an ethylene/1-butene copolymer, an ethylene/1-hexene copolymer, and/or an ethylene/1-octene copolymer.

Aspect 22. The polymer defined in any one of the preceding aspects, wherein the ethylene polymer comprises an ethylene/1-hexene copolymer.

Aspect 23. The polymer defined in any one of the preceding aspects, wherein the ethylene polymer contains, independently, less than 0.1 ppm (by weight), less than 0.08 ppm, less than 0.05 ppm, less than 0.03 ppm, etc., of Mg, V, Ti, or Cr.

Aspect 24. The polymer defined in any one of the preceding aspects, wherein the ethylene polymer further comprises at least one additive selected from an antioxidant, an acid scavenger, an antiblock additive, a slip additive, a colorant, a filler, a processing aid, a UV inhibitor, etc., or any combination thereof.

Aspect 25. An article (e.g., a blow molded product) comprising the ethylene polymer defined in any one of the preceding aspects.

Aspect 26. An article comprising the ethylene polymer defined in any one of aspects 1-24, wherein the article is an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier.

Aspect 27. A process for preparing an ethylene polymer, the process comprising contacting a base resin with a peroxide compound to produce the ethylene polymer defined in any one of aspects 1-24.

Aspect 28. The process defined in aspect 27, wherein the base resin is contacted with from 10 to 500 ppm, from 25 to 400 ppm, from 50 to 350 ppm, etc., of peroxide groups, based on the weight of the base resin.

Aspect 29. The process defined in aspect 27 or 28, wherein the contacting step comprises melt processing a blend (or mixture) of the base resin and the peroxide compound at any melt processing temperature disclosed herein, e.g., in a range from 120 to 300° C., in a range from 150 to 250° C., in a range from 175 to 225° C., etc.

Aspect 30. The process defined in aspect 29, wherein the melt processing is performed in a twin screw extrusion system.

Aspect 31. The process defined in aspect 29, wherein the melt processing is performed in a single screw extrusion system.

Aspect 32. The process defined in any one of aspects 27-31, wherein the peroxide compound comprises any suitable peroxide compound or any peroxide compound disclosed herein, e.g., 2,5-dimethyl-2,5-di(t-butylperoxy) hexane, dicumyl peroxide, t-butyl cumyl peroxide, n-butyl-4,4'-di(t-butylperoxy)valerate, etc., or any combination thereof.

Aspect 33. The process defined in any one of aspects 27-32, wherein the base resin has (or is characterized by):
  a high load melt index in a range from 2 to 40 g/10 min;
  a weight-average molecular weight in a range from 250,000 to 550,000 g/mol;
  a CY-a parameter in a range from 0.12 to 0.3;
  a tan δ at 0.1 sec$^{-1}$ in a range from 0.8 to 1.05 degrees;
  a tan δ at 100 sec$^{-1}$ in a range from 0.4 to 0.6 degrees; and
  a viscosity at 0.001 sec$^{-1}$ in a range from $1\times10^5$ to $3\times10^6$ Pa-sec.

Aspect 34. The process defined in aspect 33, wherein the base resin has a HLMI in any range disclosed herein, e.g., from 2 to 20, from 2 to 12, from 4 to 40, from 4 to 20, from 4 to 15, from 4 to 12 g/10 min, etc.

Aspect 35. The process defined in aspect 33 or 34, wherein the base resin has a Mw in any range disclosed herein, e.g., from 250,000 to 500,000, from 250,000 to 475,000, from 300,000 to 550,000, from 300,000 to 500,000 g/mol, etc.

Aspect 36. The process defined in any one of aspects 33-35, wherein the base resin has a CY-a parameter in any range disclosed herein, e.g., from 0.12 to 0.25, from 0.13 to 0.3, from 0.13 to 0.25, from 0.14 to 0.25, etc.

Aspect 37. The process defined in any one of aspects 33-36, wherein the base resin has a tan δ at 0.1 sec$^{-1}$ in any range disclosed herein, e.g., from 0.5 to 0.85 degrees, from 0.8 to 1 degree, from 0.83 to 1.05 degrees, from 0.83 to 1 degree, from 0.85 to 1.05 degrees, from 0.85 to 1 degree, etc.

Aspect 38. The process defined in any one of aspects 33-37, wherein the base resin has a tan δ at 100 sec$^{-1}$ in any range disclosed herein, e.g., from 0.4 to 0.58 degrees, from 0.4 to 0.55 degrees, from 0.45 to 0.6 degrees, from 0.45 to 0.58 degrees, from 0.45 to 0.55 degrees, etc.

Aspect 39. The process defined in any one of aspects 33-38, wherein the base resin has a viscosity at 0.001 sec$^{-1}$ in any range disclosed herein, e.g., from $1\times10^5$ to $2\times10^6$ Pa-sec, from $1\times10^5$ to $1.8\times10^6$ Pa-sec, from $8\times10^5$ to $3\times10^6$ Pa-sec, from $8\times10^5$ to $2\times10^6$ Pa-sec, from $8\times10^5$ to $1.8\times10^6$ Pa-sec, etc.

Aspect 40. The process defined in any one of aspects 33-39, wherein the base resin has a zero-shear viscosity in any range disclosed herein, e.g., from $1\times10^6$ to $1\times10^9$ Pa-sec, $1\times10^6$ to $2\times10^8$ Pa-sec, from $4\times10^6$ to $1\times10^9$ Pa-sec, from $4\times10^6$ to $2\times10^8$ Pa-sec, etc.

Aspect 41. The process defined in any one of aspects 33-40, wherein the base resin has a density in any range disclosed herein, e.g., from 0.935 to 0.965, from 0.94 to 0.965, from 0.945 to 0.965, from 0.94 to 0.96, from 0.945 to 0.96 g/cm$^3$, etc.

Aspect 42. The process defined in any one of aspects 33-41, wherein the base resin has a reverse comonomer distribution, e.g., the number of short chain branches (SCBs) per 1000 total carbon atoms of the polymer at Mw is greater than at Mn, the number of SCBs per 1000 total carbon atoms of the polymer at Mz is greater than at Mw, the number of SCBs per 1000 total carbon atoms of the polymer at Mz is greater than at Mn, etc.

Aspect 43. The process defined in any one of aspects 33-42, wherein the base resin has a Mp in any range disclosed herein, e.g., from 60,000 to 110,000, from 65,000 to 105,000, from 65,000 to 100,000 g/mol, etc.

Aspect 44. The process defined in any one of aspects 33-43, wherein the base resin has a Mn in any range disclosed herein, e.g., from 18,000 to 48,000, from 20,000 to 42,000, from 20,000 to 38,000 g/mol, etc.

Aspect 45. The process defined in any one of aspects 33-44, wherein the base resin has a ratio of Mw/Mn in any range disclosed herein, e.g., from 9 to 20, from 11 to 19, from 12 to 18, from 13 to 16, etc.

Aspect 46. The process defined in any one of aspects 33-45, wherein the base resin has a ratio of Mz/Mw in any range disclosed herein, e.g., from 4 to 9, from 5 to 8, from 5 to 7.5, from 6 to 8, etc.

Aspect 47. The process defined in any one of aspects 33-46, wherein the base resin has a ratio of weight swell to die swell (weight:die) in any range disclosed herein, e.g., from 150 to 225, from 180 to 225, from 170 to 200, etc.

Aspect 48. The process defined in any one of aspects 33-47, wherein the base resin has a hang time in any range disclosed herein, e.g., from 10 to 45 sec, from 15 to 45 sec, from 20 to 45 sec, etc.

Aspect 49. The process defined in any one of aspects 33-48, wherein the base resin has a bimodal molecular weight distribution.

Aspect 50. The process defined in any one of aspects 33-49, wherein the base resin is a single reactor product, e.g., not a post-reactor blend of two polymers, for instance, having different molecular weight characteristics.

Aspect 51. The process defined in any one of aspects 33-50, wherein the base resin comprises an ethylene/α-olefin copolymer.

Aspect 52. The process defined in any one of aspects 33-51, wherein the base resin comprises an ethylene homopolymer, an ethylene/1-butene copolymer, an ethylene/1-hexene copolymer, and/or an ethylene/1-octene copolymer.

Aspect 53. The process defined in any one of aspects 33-52, wherein the base resin has comprises an ethylene/1-hexene copolymer.

Aspect 54. The process defined in any one of aspects 33-53, wherein the base resin contains, independently, less than 0.1 ppm (by weight), less than 0.08 ppm, less than 0.05 ppm, less than 0.03 ppm, etc., of Mg, V, Ti, or Cr.

Aspect 55. The process defined in any one of aspects 33-54, wherein the base resin further comprises at least one additive selected from an antioxidant, an acid scavenger, an antiblock additive, a slip additive, a colorant, a filler, a processing aid, a UV inhibitor, etc., or any combination thereof

We claim:

1. An ethylene polymer having:
a HLMI of less than or equal to 12 g/10 min;
a Mw in a range from 200,000 to 550,000 g/mol;
a Mn in a range from 18,000 to 48,000 g/mol;
a CY-a parameter of less than or equal to 0.12;
a tan δ at 0.1 sec$^{-1}$ in a range from 0.5 to 0.9 degrees;
a tan δ at 100 sec$^{-1}$ in a range from 0.5 to 0.75 degrees; and
a viscosity at 0.001 sec$^{-1}$ in a range from $1.3\times10^6$ to $1\times10^7$ Pa-sec.

2. An article of manufacture comprising the polymer of claim 1.

3. The polymer of claim 1, wherein:
the HLMI is in a range from 1 to 10 g/10 min;
the Mw is in a range from 250,000 to 500,000 g/mol;
the Mn is in a range from 22,000 to 46,000 g/mol;
the CY-a parameter is in a range from 0.01 to 0.1;
the tan δ at 0.1 sec$^{-1}$ is in a range from 0.6 to 0.85 degrees;
the tan δ at 100 sec$^{-1}$ is in a range from 0.52 to 0.72 degrees; and
the viscosity at 0.001 sec$^{-1}$ is in a range from $1.5\times10^6$ to $6\times10^6$ Pa-sec.

4. The polymer of claim 3, wherein the ethylene polymer comprises an ethylene/1-butene copolymer, an ethylene/1-hexene copolymer, an ethylene/1-octene copolymer, an ethylene homopolymer, or a combination thereof.

5. The polymer of claim 3, wherein the polymer has a density in a range from 0.94 to 0.96 g/cm$^3$.

6. The polymer of claim 1, wherein the polymer has:
a zero-shear viscosity ($\eta_0$) in a range from $1\times10^8$ to $1\times10^{30}$ Pa-sec; and
a relaxation time ($\tau_n$) in a range from $5\times10^3$ to $1\times10^{25}$ sec.

7. The polymer of claim 1, wherein the polymer comprises an ethylene/α-olefin copolymer.

8. The polymer of claim 7, wherein the polymer contains less than 0.1 ppm by weight, independently, of Mg, V, Ti, and Cr.

9. An article of manufacture comprising the polymer of claim 8.

10. The polymer of claim 8, wherein the polymer has:
a zero-shear viscosity ($\eta_0$) in a range from $1\times10^{10}$ to $1\times10^{27}$ Pa-sec; and
a relaxation time ($\tau_n$) in a range from $1\times10^5$ to $1\times10^{23}$ sec.

11. The polymer of claim 1, wherein:
the polymer comprises an ethylene/1-butene copolymer, an ethylene/1-hexene copolymer, an ethylene/1-octene copolymer, an ethylene homopolymer, or a combination thereof; and
the polymer further comprises an additive selected from an antioxidant, an acid scavenger, an antiblock additive, a slip additive, a colorant, a filler, a processing aid, a UV inhibitor, or any combination thereof.

12. The polymer of claim 11, wherein the polymer has:
a viscosity at 100 sec$^{-1}$ in a range from 1700 to 3300 Pa-sec; and
a Mp in a range from 65,000 to 105,000 g/mol.

13. The polymer of claim 11, wherein the polymer has:
a ratio of Mw/Mn in a range from 7 to 17; and
a ratio of Mz/Mw in a range from 4.5 to 7.5.

14. The polymer of claim 11, wherein:
the HLMI is in a range from 1 to 10 g/10 min;
the Mw is in a range from 250,000 to 500,000 g/mol;
the Mn is in a range from 22,000 to 46,000 g/mol;
the CY-a parameter is in a range from 0.01 to 0.1;
the tan δ at 0.1 sec$^{-1}$ is in a range from 0.6 to 0.85 degrees;
the tan δ at 100 sec$^{-1}$ is in a range from 0.52 to 0.72 degrees; and
the viscosity at 0.001 sec$^{-1}$ is in a range from $1.5\times10^6$ to $6\times10^6$ Pa-sec.

15. An article of manufacture comprising the polymer of claim 14.

16. The polymer of claim 1, wherein the polymer has:
a ratio of weight swell to die swell in a range from 200 to 280; and
a hang time of at least 40 sec.

17. The polymer of claim 1, wherein the polymer has a number of SCBs per 1000 total carbon atoms at Mw that is greater than at Mn, or a number of SCBs per 1000 total carbon atoms of the polymer at Mz that is greater than at Mn, or both.

18. A process for preparing an ethylene polymer, the process comprising:
- contacting a base resin with a peroxide compound to produce the ethylene polymer, wherein the ethylene polymer is characterized by:
- a HLMI of less than or equal to 12 g/10 min;
- a Mw in a range from 200,000 to 550,000 g/mol;
- a Mn in a range from 18,000 to 48,000 g/mol;
- a CY-a parameter of less than or equal to 0.12;
- a tan δ at 0.1 $sec^{-1}$ in a range from 0.5 to 0.9 degrees;
- a tan δ at 100 $sec^{-1}$ in a range from 0.5 to 0.75 degrees; and
- a viscosity at 0.001 $sec^{-1}$ in a range from $1.3 \times 10^6$ to $1 \times 10^7$ Pa-sec.

19. The process of claim 18, wherein:
- the step of contacting the base resin with the peroxide compound comprises melt processing a mixture of the base resin and the peroxide compound in a twin screw extrusion system; and
- an amount of the peroxide compound is from 10 to 500 ppm by weight of peroxide groups, based on the weight of the base resin.

20. The process of claim 18, wherein:
- the base resin comprises an ethylene homopolymer, an ethylene/1-butene copolymer, an ethylene/1-hexene copolymer, an ethylene/1-octene copolymer, or a combination thereof; and
- the base resin is produced using a dual metallocene catalyst system.

* * * * *